(12) United States Patent
Hasanzadezonuzy et al.

(10) Patent No.: US 12,438,987 B2
(45) Date of Patent: Oct. 7, 2025

(54) TECHNIQUES FOR SHARING USAGE COST INFORMATION

(71) Applicant: QUALCOMM Incorporated, San Diego, CA (US)

(72) Inventors: Aria Hasanzadezonuzy, Somerville, NJ (US); Navid Abedini, Basking Ridge, NJ (US); Jianghong Luo, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 18/343,672

(22) Filed: Jun. 28, 2023

(65) Prior Publication Data
US 2025/0008025 A1    Jan. 2, 2025

(51) Int. Cl.
*H04W 4/24* (2024.01)
*H04M 15/00* (2006.01)

(52) U.S. Cl.
CPC .............. *H04M 15/58* (2013.01); *H04W 4/24* (2013.01)

(58) Field of Classification Search
CPC ... H04M 15/58; H04B 7/0456; H04B 7/0617; H04B 7/088; H04B 7/0695; H04W 4/24
See application file for complete search history.

(56) References Cited

U.S. PATENT DOCUMENTS

| 2022/0311477 | A1 | 9/2022 | Sun et al. |
| 2023/0155650 | A1* | 5/2023 | Raghavan ............ H04B 7/0608 |
| | | | 375/267 |
| 2024/0275443 | A1* | 8/2024 | Raghavan ............ H04B 7/0617 |

OTHER PUBLICATIONS

International Search Report and Written Opinion—PCT/US2024/026228—ISA/EPO—2024.

* cited by examiner

*Primary Examiner* — Siu M Lee
(74) *Attorney, Agent, or Firm* — Holland & Hart LLP

(57) ABSTRACT

Methods, systems, and devices for wireless communications are described. Generally, the techniques described herein may support balancing of system usage costs with performance. For example, a user equipment (UE) may transmit a usage cost message indicating usage costs associated with each unique set of operating parameters supported by the UE, including a first set of operating parameters associated with a first usage cost and a second set of operating parameters associated with a second usage cost. Each set of operating parameters may further be associated with a respective quantity of receive beams of the UE for operating according to the respective set of operating parameters. Additionally, the UE may receive an indication for the UE to operate according to the first set of operating parameters or the second set of operating parameters based on the first usage cost and the second usage cost.

30 Claims, 15 Drawing Sheets

Usage Cost Message 215

Control Message 210

TECHNIQUES FOR SHARING USAGE COST INFORMATION

FIELD OF TECHNOLOGY

The following relates to wireless communications, including techniques for sharing usage cost information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that enable techniques for sharing usage cost information. Generally, the techniques described herein enable network energy savings based on sharing of usage cost information. A wireless device, such as a user equipment (UE), may transmit, to a network entity, a usage cost message indicating usage costs associated with each configuration of the UE. Each configuration may be associated with a quantity of receive beams of the UE and the usage cost message may indicate a first usage cost associated with both a first configuration of the UE and a first quantity of receive beams. The usage cost message may also indicate a second usage cost associated with both a second configuration of the UE and a second quantity of receive beams. Based on the first and second usage costs, the network entity may determine which configuration (e.g., of the first configuration and the second configuration) to configure for the UE by determining which configuration may support balancing of energy savings and performance for a wireless communications system including at least the network entity and the UE based on the usage costs (e.g., the first usage cost and the second usage cost) or other factors. Accordingly, the network entity may transmit, to the UE, an indication for the UE to operate according to the first configuration or the second configuration based on the first usage cost and the second usage cost (e.g., based on the determination by the network entity).

A method for wireless communications by a wireless device is described. The method may include transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and receiving an indication for the wireless device to operate according to one of the first set of operating parameters or the second set of operating parameters based on the first usage cost and the second usage cost.

A wireless device for wireless communications is described. The wireless device may include one or more memories storing processor executable code, and one or more processors coupled with the one or more memories. The one or more processors may individually or collectively operable to execute the code to cause the wireless device to transmit a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and receive an indication for the wireless device to operate according to one of the first set of operating parameters or the second set of operating parameters based on the first usage cost and the second usage cost.

Another wireless device for wireless communications is described. The wireless device may include means for transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and means for receiving an indication for the wireless device to operate according to one of the first set of operating parameters or the second set of operating parameters based on the first usage cost and the second usage cost.

A non-transitory computer-readable medium storing code for wireless communications is described. The code may include instructions executable by a processor to transmit a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and receive an indication for the wireless device to operate according to one of the first set of operating parameters or the second set of operating parameters based on the first usage cost and the second usage cost.

Some examples of the method, wireless devices, and non-transitory computer-readable medium described herein may further include operations, features, means, or instructions for receiving a second indication of a usage cost function associated with calculating usage costs, where the first usage cost and the second usage cost may be based on the usage cost function.

In some examples of the method, wireless devices, and non-transitory computer-readable medium described herein, transmitting the usage cost message may include operations, features, means, or instructions for transmitting a second indication of a set of multiple codebooks supported by the wireless device, where a first codebook of the set of multiple codebooks may be associated with both the first quantity of receive beams and the first usage cost, where a second codebook of the set of multiple codebooks may be associated with both the second quantity of receive beams and the second usage cost, and where the usage cost message includes the second indication of the set of multiple codebooks.

Some examples of the method, wireless devices, and non-transitory computer-readable medium described herein may further include operations, features, means, or instructions for receiving a request for the wireless device to provide usage costs associated with each set of operating parameters supported by the wireless device including at least the first set of operating parameters and the second set of operating parameters, where transmitting the usage cost message may be based on receiving the request.

Some examples of the method, wireless devices, and non-transitory computer-readable medium described herein may further include operations, features, means, or instructions for receiving one or more control signals indicating the first set of operating parameters and the second set of operating parameters, where transmitting the usage cost message may be based on receiving the one or more control signals.

Some examples of the method, wireless devices, and non-transitory computer-readable medium described herein may further include operations, features, means, or instructions for transmitting a second indication of a usage cost rule associated with communicating using beam sets, where the first usage cost and the second usage cost may be relative to a third usage cost associated with communicating using a single receive beam based on the usage cost rule.

In some examples of the method, wireless devices, and non-transitory computer-readable medium described herein, the first quantity of receive beams may be associated with a first beam set and the second quantity of receive beams may be associated with a second beam set and the first usage cost and the second usage cost may be based on communicating using the first beam set and the second beam set, respectively.

In some examples of the method, wireless devices, and non-transitory computer-readable medium described herein, the first quantity of receive beams may be associated with a first antenna panel at the wireless device and the second quantity of receive beams may be associated with a second antenna panel at the wireless device, the first usage cost may be based on communicating using the first antenna panel, and the second usage cost may be based on communicating using the second antenna panel.

In some examples of the method, wireless devices, and non-transitory computer-readable medium described herein, each set of operating parameters includes a quantity of codebooks, one or more sets of receive beam, one or more processing parameters, an analog to digital converter resolution, a digital power distortion, one or more beamforming parameters, a transmit power, a quantity of repetitions, or any combination thereof.

In some examples of the method, wireless devices, and non-transitory computer-readable medium described herein, each of the first usage cost and the second usage cost includes a respective indication of a power consumption, a latency, a throughput, a level of interference, or any combination thereof.

In some examples of the method, wireless devices, and non-transitory computer-readable medium described herein, each of the first usage cost and the second usage cost may be associated with communicating according to a respective set of operating parameters, maintaining the respective set of operating parameters, training the wireless device according to the respective set of operating parameters, or any combination thereof.

In some examples of the method, wireless devices, and non-transitory computer-readable medium described herein, each of the first usage cost and the second usage cost includes an absolute value of a respective usage cost or a relative value of the respective usage cost.

Some examples of the method, wireless devices, and non-transitory computer-readable medium described herein may further include operations, features, means, or instructions for receiving a second indication of a baseline set of operating parameters, where the first usage cost and the second usage cost may be relative to a baseline usage cost associated with the baseline set of operating parameters.

In some examples of the method, wireless devices, and non-transitory computer-readable medium described herein, the usage cost message may be transmitted semi-statically, semi-persistently, or dynamically.

In some examples of the method, wireless devices, and non-transitory computer-readable medium described herein, the first usage cost and the second usage cost may be associated with transmitting one or more signals in accordance with the first set of operating parameters and the second set of operating parameters, respectively, may be associated with receiving one or more signals in accordance with the first set of operating parameters and the second set of operating parameters, respectively, or both.

A method for wireless communications by a network entity is described. The method may include receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and transmitting an indication for the wireless device to operate according to one of the first set of operating parameters or the second set of operating parameters based on the first usage cost and the second usage cost.

A network entity for wireless communications is described. The network entity may include one or more memories storing processor executable code, and one or more processors coupled with the one or more memories. The one or more processors may individually or collectively operable to execute the code to cause the network entity to receive a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and transmit an indication for the wireless device to operate according to one of the first set of operating parameters or the second set of operating parameters based on the first usage cost and the second usage cost.

Another network entity for wireless communications is described. The network entity may include means for receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and means for transmitting an indication for the wireless device to operate according to one of the first set of operating parameters or the second set of operating parameters based on the first usage cost and the second usage cost.

A non-transitory computer-readable medium storing code for wireless communications is described. The code may include instructions executable by a processor to receive a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters and transmit an indication for the wireless device to operate according to one of the first set of operating parameters or the second set of operating parameters based on the first usage cost and the second usage cost.

Some examples of the method, network entities, and non-transitory computer-readable medium described herein may further include operations, features, means, or instructions for transmitting a second indication of a usage cost function associated with calculating usage costs, where the first usage cost and the second usage cost may be based on the usage cost function.

Some examples of the method, network entities, and non-transitory computer-readable medium described herein may further include operations, features, means, or instructions for receiving a second indication of a set of multiple codebooks supported by the wireless device, where a first codebook of the set of multiple codebooks may be associated with both the first quantity of receive beams and the first usage cost, and where a second codebook of the set of multiple codebooks may be associated with both the second quantity of receive beams and the second usage cost, and where the usage cost message includes the second indication of the set of multiple codebooks.

Some examples of the method, network entities, and non-transitory computer-readable medium described herein may further include operations, features, means, or instructions for transmitting a request for the wireless device to provide usage costs associated with each set of operating parameters supported by the wireless device including at least the first set of operating parameters and the second set of operating parameters, where transmitting the usage cost message may be based on receiving the request.

Some examples of the method, network entities, and non-transitory computer-readable medium described herein may further include operations, features, means, or instructions for transmitting one or more control signals indicating the first set of operating parameters and the second set of operating parameters, where transmitting the usage cost message may be based on receiving the one or more control signals.

Some examples of the method, network entities, and non-transitory computer-readable medium described herein may further include operations, features, means, or instructions for receiving a second indication of a usage cost rule associated with communicating using beam sets, where the first usage cost and the second usage cost may be relative to a third usage cost associated with communicating using a single receive beam based on the usage cost rule.

In some examples of the method, network entities, and non-transitory computer-readable medium described herein, the first quantity of receive beams may be associated with a first beam set and the second quantity of receive beams may be associated with a second beam set and the first usage cost and the second usage cost may be based on communicating using the first beam set and the second beam set, respectively.

In some examples of the method, network entities, and non-transitory computer-readable medium described herein, the indication may be associated with the wireless device operating according to the first set of operating parameters and the method, apparatuses, and non-transitory computer-readable medium may include further operations, features, means, or instructions for transmitting, to a second wireless device, one or more control signals indicating a third set of operating parameters based on the first set of operating parameters.

In some examples of the method, network entities, and non-transitory computer-readable medium described herein, the first set of operating parameters may be associated with the network entity communicating with the wireless device via the second wireless device.

In some examples of the method, network entities, and non-transitory computer-readable medium described herein, the first quantity of receive beams may be associated with a first antenna panel at the wireless device and the second quantity of receive beams may be associated with a second antenna panel at the wireless device and the first usage cost and the second usage cost may be based on communicating using the first antenna panel and the second antenna panel, respectively.

In some examples of the method, network entities, and non-transitory computer-readable medium described herein, each set of operating parameters includes a quantity of codebooks, one or more sets of receive beam, one or more processing parameters, an analog to digital converter resolution, a digital power distortion, one or more beamforming parameters, a transmit power, a quantity of repetitions, or any combination thereof.

In some examples of the method, network entities, and non-transitory computer-readable medium described herein, each of the first usage cost and the second usage cost includes a respective indication of a power consumption, a latency, a throughput, a level of interference, or any combination thereof.

In some examples of the method, network entities, and non-transitory computer-readable medium described herein, each of the first usage cost and the second usage cost may be associated with the wireless device communicating according to a respective set of operating parameters, maintaining the respective set of operating parameters, training the wireless device according to the respective set of operating parameters, or any combination thereof.

In some examples of the method, network entities, and non-transitory computer-readable medium described herein, each of the first usage cost and the second usage cost includes an absolute value of a respective usage cost or a relative value of the respective usage cost.

Some examples of the method, network entities, and non-transitory computer-readable medium described herein may further include operations, features, means, or instructions for transmitting a second indication of a baseline set of operating parameters, where the first usage cost and the second usage cost may be relative to a baseline usage cost associated with the baseline set of operating parameters.

In some examples of the method, network entities, and non-transitory computer-readable medium described herein, the usage cost message may be received semi-statically, semi-persistently, or dynamically.

DETAILED DESCRIPTION

Figure 1:
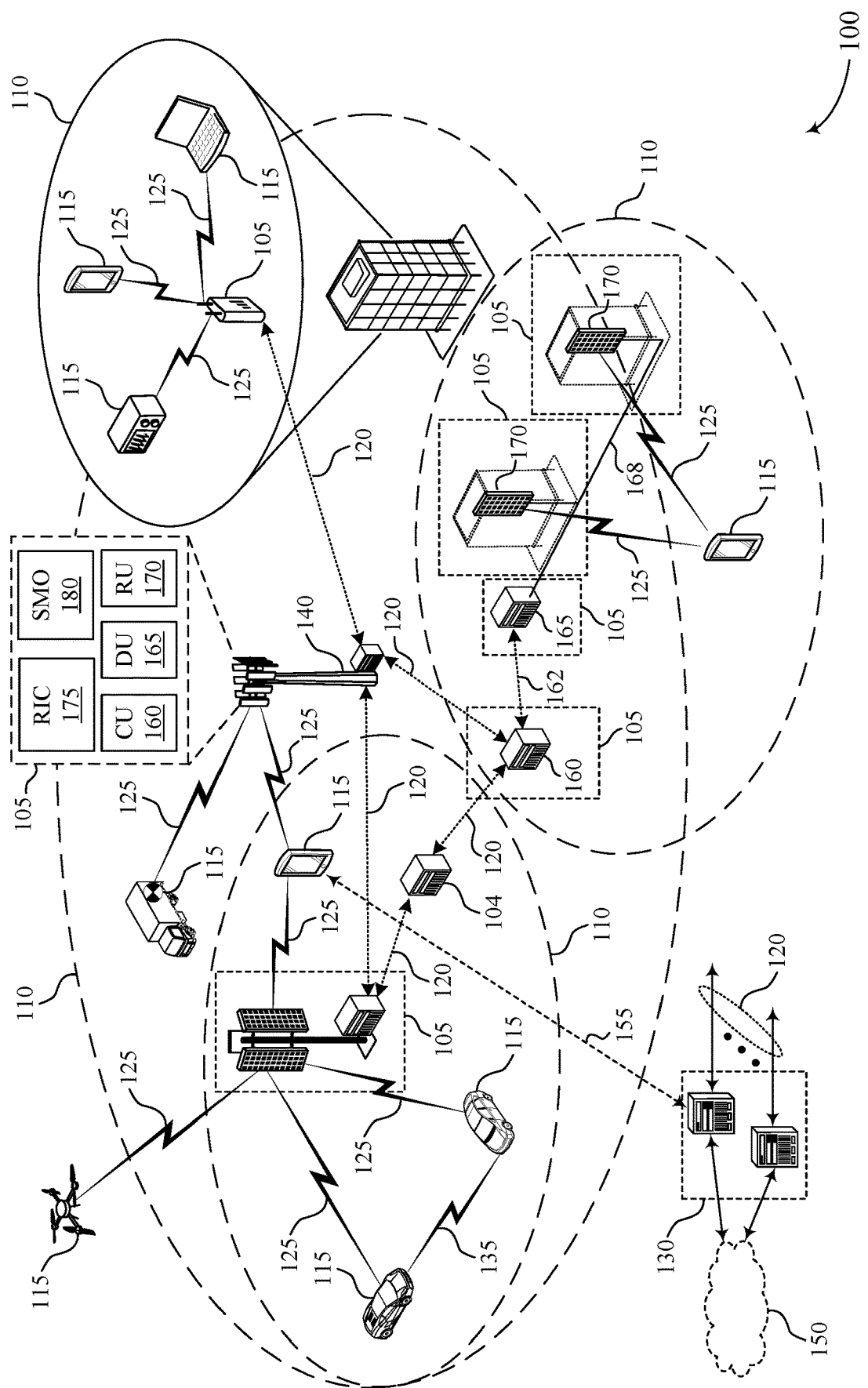
FIG. 1 shows an example of a wireless communications system that supports techniques for sharing usage cost information in accordance with one or more aspects of the present disclosure.

Some wireless communications systems may support balancing of usage costs with performance, which may be referred to as optimizing energy efficiency for the wireless communications system. For example, a wireless communications system may include at least a network entity and a wireless device, such as a user equipment (UE). In such cases, the UE may support multiple different configurations, such as first configuration and a second configuration, where each configuration is associated with a usage cost. However, the network entity may be unaware of the usage costs associated with each configuration of the UE. As such, the network entity may be unable to optimize energy efficiency of the wireless communications system due to lack of knowledge about the different usage costs, which may result in poor performance, high usage costs, or both.

Accordingly, techniques described herein may enable a wireless device, such as a UE, to transmit an indication of one or more usage costs, each of which may be associated with a respective configuration of the UE. That is, the UE may transmit, to a network entity, a usage costs message indicating usage costs associated with each configuration of the UE, where each configuration is associated with a quantity of receive beams of the UE. For example, a first configuration of the UE may be associated with a first quantity of receive beams further associated with a first usage cost and a second configuration of the UE may be associated with a second quantity of receive beams associated with a second usage cost. As such, the UE may transmit the usage cost message indicating the first usage cost and the second usage cost and the network entity may transmit, to the UE, an indication for the UE to operate according to the first configuration or the second configuration based on the first usage cost and the second usage cost.

In some examples, the indication of the first usage cost and the second usage cost may be codebook-specific. That is, the first configuration may be associated with a first codebook and the second configuration may be associated with a second codebook, such that the usage cost message indicates the first usage cost is associated with the first codebook and the second usage cost is associated with the second codebook. Additionally, or alternatively, the indication of the first usage cost and the second usage cost may be beam-specific. That is, the first configuration may be associated with the first quantity of receive beams and the second configuration may be associated with the second quantity of receive beams, such that the usage cost message indicates the first usage cost is associated with the first quantity of receive beams and the second usage cost is associated with the second quantity of receive beams. Additionally, or alternatively, the indication of the first usage cost and the second usage cost may be beam set-specific. That is, the first quantity of receive beams may be associated with a first beam set and the second quantity of receive beams may be associated with a second beam set, such that the usage cost message indicates the first usage cost is associated with the first beam set and the second usage cost is associated with the second beam set.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for sharing usage cost information.

FIG. 1 shows an example of a wireless communications system 100 that supports techniques for sharing usage cost information in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for sharing usage cost information as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may support balancing of system usage costs with performance. That is, a wireless device, such as a UE 115 may transmit, to a network entity 105 (e.g., the network entity 105 may receive or obtain), a usage cost message indicating usage costs associated with each configuration of the UE 115, where each configuration is associated with a quantity of receive beams of the UE 115. For example, a first configuration of the UE 115 may be associated with a first quantity of receive beams further associated with a first usage cost and a second configuration of the UE 115 may be associated with a second quantity of receive beams associated with a second usage cost. As such, the UE may transmit, to the network entity 105, the usage cost message indicating the first usage cost and the second usage cost, such that the network entity 105 may balance usage costs associated with the wireless communications system 100 with performance of the wireless communications system 100. In other words, the network entity 105 may transmit (e.g., output), to the UE 115, an indication of the first configuration or the second configuration based on the first usage cost and the second usage cost, such that a configuration of the UE may support the balancing of usage costs associated with the wireless communications system 100 with performance of the wireless communications system 100.

Figure 2:
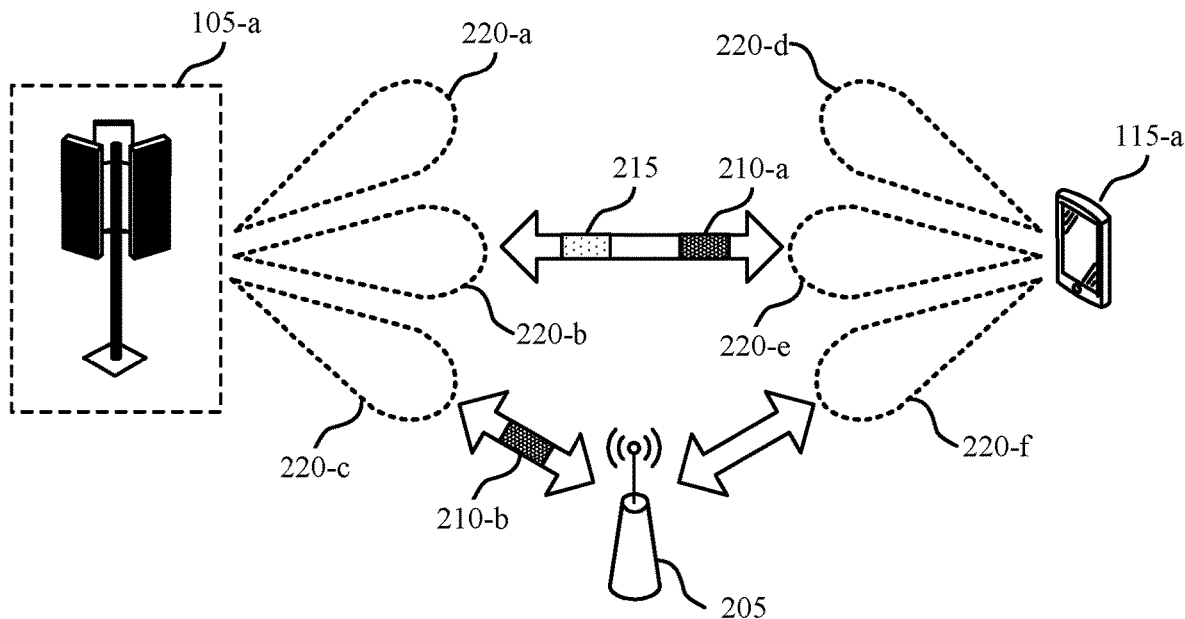
FIG. 2 shows an example of a wireless communications system that supports techniques for sharing usage cost information in accordance with one or more aspects of the present disclosure.
Figure 2:
Figure 2:

FIG. 2 shows an example of a wireless communications system 200 that supports techniques for sharing usage cost information in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-a) and one or more network entities 105 (e.g., a network entity 105-a), which may be examples of the corresponding devices as described herein.

In some wireless communications systems, such as the wireless communications system 200, a network entity 105 (e.g., a network node or cell), such as the network entity 105-a, a UE 115, such as the UE 115-a, or both, may employ one or more energy (e.g., power) saving techniques. For example, the network entity 105-a (e.g., in the context of Self-Organizing Networks (SONs) or Minimization of Drive Tests (MDTs)) may support coordination signaling to turn on or off the network entity 105-a. That is, the network entity 105-a may enter an energy saving mode based on the network entity 105-a not serving any UEs 115 (or serving a number of UEs 115 below a threshold number), where different energy saving modes are associated with different tradeoffs between energy saving and connection latency. Additionally, or alternatively, a UE 115, such as the UE 115-a, or both, may employ one or more energy (e.g., power) saving techniques. For example, the UE 115-a may operate according to a discontinuous reception (DRX) cycle to reduce power consumption of the UE 115-a.

In some examples, the network entity 105-a may attempt to support energy savings of the wireless communications system 200. That is, the network entity 105-a may attempt to balance usage cost and performance of the entire wireless communications system 200 (e.g., the whole system, or for one or more devices with which the network entity 105-a is communicating, or for the network entity 105-a). A usage cost may be any example of a quantifiable impact incurred by a wireless device. For example, usage costs may include one or more of power consumption, latency, level of interference, or the like. In some cases, usage cost of the wireless communications system 200 may be based on a total weighted usage costs of the wireless communications system 200, or a weighted sum of usage costs associated with each wireless device (e.g., the network entity 105-a, the UE 115-a, an RIS 205) in the wireless communications system 200. For example, the usage costs of the wireless communications system 200 may include a weighted sum of power consumption associated with the network entity 105-a, power consumption associated with the UE 115-a, and power consumption associated with the RIS 205.

Performance of the wireless communications system 200 may be quantified in terms of one or more performance metrics, such as throughput, latency, reliability, failure rate, error rate, or the like. Additionally, performance of the wireless communications system 200 may include collective performance of each wireless device in the wireless communications system 200, individual performance of each wireless device in the wireless communications system 200, collective performance of a subset of wireless devices (e.g., the network entity 105-a and the UE 115-a) in the wireless communications system 200, individual performance of a subsets of wireless devices in the wireless communications system 200, or any combination thereof.

As such, the network entity 105-a may attempt to maximize or improve energy efficiency (e.g., ratio of performance to usage cost) by minimizing a total weighted usage cost while maintaining a threshold level of performance (e.g., balance throughout and power consumption). However, the UE 115-a may support multiple configurations and the network entity 105-a may not be aware of the supported configurations of the UE 115-a, usage costs (e.g., power consumption) associated with each of the supported configurations of the UE 115-a, or both. In other words, a usage cost associated with a supported configuration of the UE 115-a may be associated with the UE 115-a maintaining the supported configuration, training the UE 115-a based on the supported configuration, the UE 115-a operating according to the supported configuration, or any combination thereof (e.g., a usage cost model may include maintaining, training, and operating the UE 115-a), and the network entity 105-a may be unaware of the usage cost of the UE 115-a associated with training, maintaining, or operating according to the supported configuration.

For example, the UE 115-a may support one or more configurations associated with transmitting signaling (e.g., transmit configuration) which may each be associated with one or more of a transmit power, one or more transmit beamforming parameters (e.g., transmit beamforming configuration), one or more parameters associated with processing signaling for transmission (e.g., digital pre-distortion (DPD), filtering, etc.), or the like. In some examples, the network entity 105-a may be aware of the one or more transmit powers based on a power headroom report from the UE 115-a, the one or more beamforming parameters based on a recommended quantity (e.g., number) of CSI-RS repetitions, or both. Additionally, or alternatively, the UE 115-a may support one or more configurations associated with receiving signaling (e.g., receive configuration) which may each be associated with one or more of a receive beam(s), one or more receive beamforming parameters (e.g., receive beamforming configuration), one or more parameters associated with processing received signaling (e.g., analog to digital converter (ADC) resolution, one or more techniques associated with improving reception, such as digital post distortion, etc.), or the like thereof. As such, the network entity 105-a may not be aware of the supported configurations of the UE 115-a (e.g., receive configurations, transmit configurations, or both), usage costs associated with each of the supported configurations of the UE 115-a, or both. Thus, the network entity 105-a may be unable to balance usage cost and performance of the entire wireless communications system 200 based on lacking information (e.g., usage costs) associated with the supported configurations of the UE 115-a.

As an illustrative example, the UE 115-a may communicate directly with the network entity 105-a (e.g., without the RIS 205) and communications between the UE 115-a and the network entity 105-a may be associated with a signal-to-noise ratio (SNR). In some cases, the UE 115-a may detect (e.g., identify) the RIS 205 located within a proximity of the UE 115-a, such that the UE 115-a may communicate with the network entity 105-a indirectly via the RIS 205. In other words, the RIS may forward transmissions from the UE 115-a to the network entity 105-a. In such cases, the UE 115-a may consume less power while achieving a same (e.g., or better) SNR as compared to direct communications with the network entity 105-*a* based on communicating via the RIS 205 (e.g., based on the RIS 205 being closer to the UE 115-*a* than the network entity 105-*a*). In other words, a first configuration of the UE 115-*a* associated with indirect communication with the network entity 105-*a* (e.g., via the RIS 205) may consume less power than a second configuration of the UE 115-*a* associated with direct communications with the network entity 105-*a* without impacting performance. However, the network entity 105-*a* may consume more power communicating with the UE 115-*a* indirectly (e.g., via the RIS 205) than communicating with the UE 115-*a* directly (e.g., not via the RIS 205). For example, the network entity 105-*a* may transmit additional configuration signaling to the RIS 205 to enable the indirect communications, resulting in increased power consumption by the network entity 105-*a*. However, as described previously, the network entity 105-*a* may be unaware of supported configurations of the UE 115-*a* (e.g., or additional wireless devices, such as the RIS 205), such as the first configuration and the second configuration, usage costs (e.g., power consumption) associated with each of the supported configurations of the UE 115-*a*, or both, and, as such, may be unable to balance usage cost and performance of the entire wireless communications system 200.

Accordingly, techniques described herein may support balancing usage cost and performance of the entire wireless communications system 200 based on transmission of usage cost information associated with supported configurations of the UE 115-*a* (e.g., a wireless device in the wireless communications system 200). That is, the UE 115-*a* may be associated with multiple configurations (e.g., supported configurations). In some examples, the UE 115-*a* may receive one or more control message 210 indicating the multiple configurations, may be pre-configured with the multiple configurations, may select the multiple configurations, or any combination thereof.

As such, the UE 115-*a* may transmit, to the network entity 105-*a*, a usage cost message 215 indicating a usage cost associated with each configuration of the multiple configurations, a performance associated with each configuration, or both. For example, the UE 115-*a* may support a first configuration and a second configuration, where the first configuration is associated with a first usage cost (e.g., cost1) and a first performance (e.g., perf1) and the second configuration is associated with a second usage cost (e.g., cost2) and a second performance (e.g., perf2). As such, the usage cost message may include an indication that the first configuration is associated with the first usage cost, the first performance, or both, and the second configuration is associated with the second usage cost, the second performance, or both. In examples in which the UE 115-*a* indicates both usage cost and performance for each configuration, the UE 115-*a* may indicate usage cost and performance for each configuration as separate values or may indicate a ratio of usage cost to performance (e.g., cost/perf or perf/cost) for each configuration.

Additionally, or alternatively, the usage costs (e.g., usage cost information) may be indicated as (e.g., stated as or represented by) an absolute value or a relative value. The relative value may be relative to a reference configuration of the multiple configurations. That is, the reference configuration may be associated with a lowest usage cost of the multiple configurations, may be associated with a highest usage cost of the multiple configurations, may meet one or more reference configuration criteria, may be indicated to the UE 115-*a* (e.g., may be a baseline configuration), or any combination thereof. For example, the UE 115-*a* may receive, from the network entity 105-*a*, a control message 210 indicating the reference configuration (e.g., the baseline configuration) from the multiple configurations, such that usage costs for other configurations of the multiple configurations may be indicated to the network entity 105-*a* (e.g., via the usage cost message 215) with respect to the reference configuration. In other words, the usage cost message 215 may indicate usage costs for the other configuration as a delta usage cost (e.g., absolute value or relative value) with respect to the reference configuration. In some examples, the UE 115-*a* may indicate, to the network entity 105-*a* (e.g., via the usage cost message, a control message 210, or both), one or more configurations of the UE 115-*a* (e.g., details of one or more of the multiple configurations). That is, the UE 115-*a* may indicate parameters associated with each of the multiple configurations (e.g., what each of the multiple configurations are).

In some examples, the network entity 105-*a* may transmit, to the UE 115-*a*, a usage cost function (e.g., a parameterized equation), such as a power model, associated with calculating usage costs for each of the multiple configurations of the UE 115-*a*. That is, the network entity 105-*a* may request for the UE 115-*a* to calculate the usage costs for each of the multiple configurations of the UE 115-*a* based on the usage cost function and the UE 115-*a* may report (e.g., via the usage cost message 215) one or more outputs of the usage cost function back to the network entity 105-*a*.

In some examples, the usage cost message 215 may indicate the usage costs for each of the multiple configurations of the UE 115-*a* in a codebook-specific manner, a beam-specific manner, a beam set-specific manner, or any combination thereof.

In a codebook-specific manner, the UE 115-*a* may report (e.g., via the usage cost message 215) an indication of a usage cost associated with each codebook supported by the UE 115-*a*, where each of the multiple configurations of the UE 115-*a* is associated with a supported codebook. That is, the UE 115-*a* may support a quantity of receive beams 220 for each transmit beam 220 associated with the network entity 105-*a* (e.g., a transmit beam 220-*a*, a transmit beam 220-*b*, and a transmit beam 220-*c*). In some examples, the UE 115-*a* may indicate the quantity of receive beams 220 for each transmit beam 220 via a single value in a field (e.g., maxNumberRxBeam) in a control message 210. Further, the field in the control message 210 may be extended to indicate multiple values instead of a single value. Extension of the field may indicate that the UE 115-*a* supports multiple codebooks. As such, the UE 115-*a* may indicate to the network entity 105-*a* (e.g., via maxNumberRxBeam) a quantity (e.g., number) of codebooks supported by the UE 115-*a* and a quantity (e.g., P3) of receive beams 220 (e.g., per transmit beam 220) that the UE 115-*a* may support in each codebook of the multiple codebooks. The UE 115-*a* may indicate the quantity of codebooks supported by the UE 115-*a* based on indicating a quantity of CSI-RS repetitions supported by the UE 115-*a*. For example, one CSI-RS repetition quantity may indicate (e.g., imply) one codebook, two CSI-repetition quantities may indicate two codebooks, and so on. For example, the UE 115-*a* may indicate {2,4} (e.g., via maxNumberRxBeam) as recommended CSI-RS repetitions, which further indicates that the UE 115-*a* supports two codebooks including a first codebook associated with two CSI-RS repetitions and a second codebook associated with four CSI-RS repetitions. The quantity of CSI-RS repetitions further indicates (e.g., implies) a quantity of receive beams 220 supported by a codebook. For example, the first codebook may support two receive beams 220 based on the first codebook being associated with two CSI-RS repetitions and the second codebook may support four receive beams 220 based on the second codebook being associated with four CSI-RS repetitions.

As such, each codebook of the multiple codebooks may be associated with a different usage cost (e.g., cost/performance) for the UE 115-a (e.g., which the network entity 105-a is unaware of). As such, the UE 115-a may indicate (e.g., via the usage cost message 215) a usage cost associated with each codebook of the multiple codebooks. For example, the usage cost message 215 may indicate a first usage cost associated with the first codebook (e.g., a first configuration of the UE 115-a) and a second usage cost associated with the second codebook (e.g., a second configuration of the UE 115-a). In some examples, the indication (e.g., via the usage cost message 215) may be transmitted semi-statically, semi-persistently (e.g., event triggered), or dynamically. For example, the UE 115-a may dynamically indicate the usage cost message 215 based on a battery level of the UE 115-a changing at a rate exceeding a threshold value (e.g., changing faster than a previous duration).

In some examples, the usage cost message 215 may be included in a control message 210. That is, the UE 115-a may transmit a control message 210 indicating one or more capabilities of the UE 115-a (e.g., such as via maxNumberRxBeam). The one or more capabilities of the UE 115-a may include the quantity of codebooks supported by the UE 115-a, the quantity of CSI-RS repetitions supported by the UE 115-a, the quantity of receive beams 220 supported by the UE 115-a, or any combination thereof. Additionally, the control message 210 indicating the one or more capabilities of the UE 115-a may further indicate the usage cost associated with each of the multiple codebooks supported by the UE 115-a (e.g., include the usage cost message 215, include usage costs in the maxNumberRxBeam field).

Figure 3A:
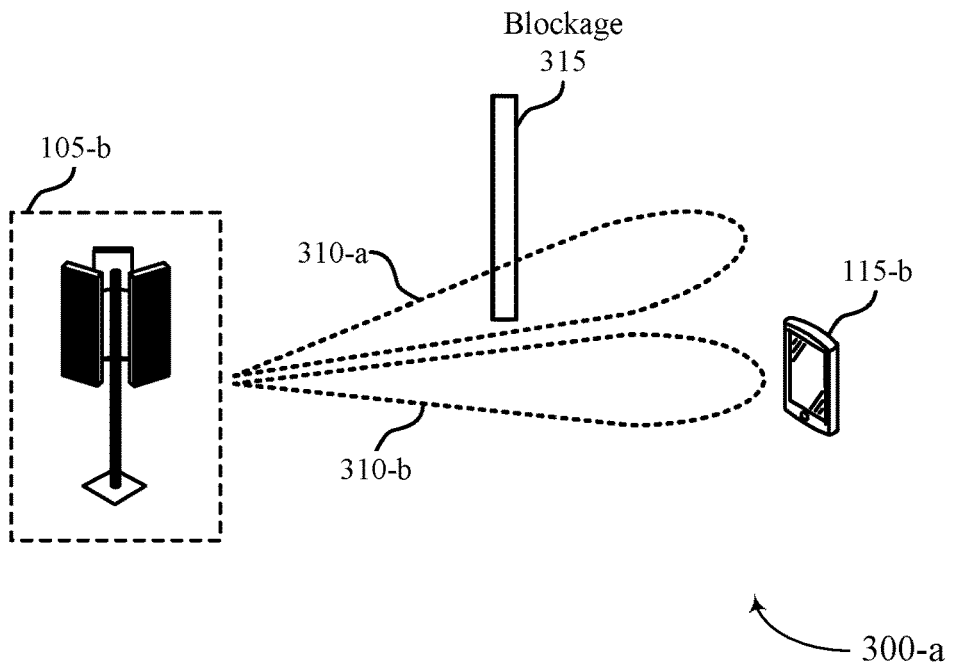
FIGS. 3A and 3B show examples of wireless communications systems that supports techniques for sharing usage cost information in accordance with one or more aspects of the present disclosure.
Figure 3B:
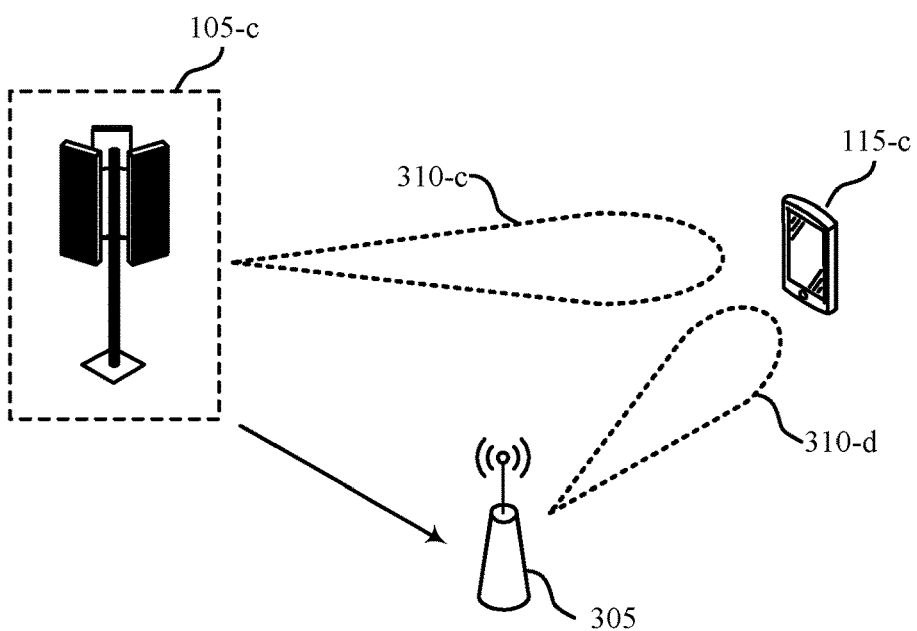

In a beam-specific manner, the UE 115-a may report (e.g., via the usage cost message 215) an indication of a usage cost associated with each beam 220 (e.g., receive beam or transmit beam) supported by the UE 115-a, where each of the multiple configurations of the UE 115-a is associated with a beam 220, as described further with reference to FIGS. 3A and 3B.

In a beam set-specific manner, the UE 115-a may report (e.g., via the usage cost message 215) an indication of a usage cost associated with each beam set supported by the UE 115-a, where each of the multiple configurations of the UE 115-a is associated with a supported beam set. That is, the UE 115-a may be capable of performing multi-TRP operations, multi-beam operations, or both. That is, the UE 115-a may support communicating via multiple beams 220 (e.g., transmitting via multiple beams 220, receiving via multiple beams 220, or transmitting and receiving simultaneously via multiple beams 220). In such cases, the UE 115-a may share one or more operations performed by the UE 115-a (e.g., most elements of the UE 115-a), such as baseband processing, modulation, demodulation, or the like thereof, between the multiple beams 220. For example, the UE 115-a may use a same set of processing elements to process signaling received via a beam 220-d and a beam 220-e, where the beam 220-d and the beam 220-e are associated with a first beam set. As such, a usage cost associated with communicating via multiple beams 220 simultaneously may be different than a usage cost associated with communicating via multiple beams 220 individually (e.g., communicating via each of the multiple beams 220 on their own). For example, a usage cost associated with communicating via the first beam set, including the beam 220-d and the beam 220-e, may be different than a usage cost associated with communicating via the beam 220-d, a usage cost associated with communicating via the beam 220-e, or both. As such, the usage cost message 215 may indicate a usage cost associated with each beam set supported by the UE 115-a. For example, the usage cost message 215 may indicate a first usage cost associated with communicating via the first beam set, including the beam 220-d and the beam 220-e, and a second usage cost associated with a second beam set, including the beam 220-e and a beam 220-f.

In some examples, indicating a usage cost associated with each beam set may result in increased overhead (e.g., as compared to other manners of indication) based on the UE 115-a support multiple different sets of beams (e.g., beam sets). As such, the UE 115-a may report usage costs associated with beam sets according to a rule, where the rule defines a relationship between a usage cost of simultaneous use of multiple beams and usage cost of individual use of a single beam. In other words, the rule may enable the UE 115-a to determine a usage cost associated with communicating via a beam set based on (e.g., relative to) a usage cost of associated with communicating via an individual beam. For example, the UE 115-a may calculate a usage cost associated with a beam set according to the following Equation 5:

$$C_{1,2} = a(C_1 + C_2) \qquad (1)$$

where the parameter $C_1$ represents a usage cost associated with communicating via a first beam of a beam set, the parameter $C_2$ represents a usage cost associated with communicating via a second beam of the beam set, the parameter a represents a parameter defined by the rule (e.g., any number), and $C_{1,2}$ represents a usage cost associated with communicating via the beam set (e.g., simultaneously via the first beam of the beam set and the second beam of the beam set). In some examples, the UE 115-a may determine the rule and may transmit an indication of the rule to the network entity 105-a or the network entity 105-a may determine the rule and transmit the indication of the rule to the UE 115-a. Additionally, or alternatively, the UE 115-a (e.g., and the network entity 105-a) may be pre-configured with the rule.

Additionally, or alternatively, the usage costs indicated via the usage cost message 215 may be specific to transmission by the UE 115-a, reception by the UE 115-a, or both (e.g., full-duplex). That is, a first usage cost may be associated with the UE 115-a transmitting according to a given configuration, a second usage cost may be associated with the UE 115-a receiving according to the given configuration, and a third usage cost may be associated with the UE 115-a transmitting and receiving, simultaneously (e.g., in a full-duplex mode), according to the given configuration, where the first usage cost, the second usage cost, and the third usage cost are different. Thus, the usage cost message 215 may indicate multiple usage costs associated with each configuration of the UE 115-a (e.g., may indicate the first usage cost, the second usage cost, and the third usage cost for the given configuration). In such cases, the usage cost message 215 may indicate whether each usage cost is associated with transmitting, receiving, or both. Alternatively, the usage cost message 215 may be associated with transmission by the UE 115-a, reception by the UE 115-a, or both, such that the usage cost message 215 indicates usage costs for each of the multiple configurations of the UE 115-*a* associated with transmission by the UE 115-*a*, reception by the UE 115-*a*, or both, respectively.

As such, the network entity 105-*a* may determine (e.g., select) a configuration of one or more wireless devices of the wireless communications system 200 based on the usage cost message 215 (e.g., and any other usage cost messages 215 received from other wireless devices of the wireless communications system 200, such as the RIS 205). For example, the network entity 105-*a* may determine that a first configuration of the UE 115-*a* associated with indirect communications via the RIS 205 may support balancing usage cost and performance of the entire wireless communications system 200. As such, the network entity 105-*a* may transmit, to the UE 115-*a*, a control message 210-*a* indicating the first configuration. In some examples, the UE 115-*a* may already be operating according to the first configuration. As such, the control message 210-*a* may indicate for the UE 115-*a* to continue to operate according to the first configuration (e.g., not to change configuration) or the network entity 105-*a* may refrain from transmitting the control message 210-*a*. Additionally, the network entity 105-*a* may transmit, to the RIS 205, a control message 210-*b* indicating a configuration of the RIS 205 to support the first configuration of the UE 115-*a*. In other words, the indicated configuration of the RIS 205 may enable the UE 115-*a* to operate according to the first configuration of the UE 115-*a* (e.g., to communicate via the RIS 205). Similar to the UE 115-*a*, in some cases, the RIS 205 may already be operating according to the indicated configuration of the RIS 205. As such, the control message 210-*b* may indicate for the RIS 205 to continue to operate according to the indicated configuration of the RIS 205 (e.g., not to change configuration) or the network entity 105-*a* may refrain from transmitting the control message 210-*b*.

Though described in the context of a wireless communications system 200 including a network entity 105, a UE 115, and an RIS 205, this description is not to be regarded as a limitation of the present disclosure. In this regard, the wireless communications system 200 may include any quantity and any combination of wireless devices, each capable of transmitting or receiving a usage cost message 215.

FIGS. 3A and 3B each show an example of a wireless communications system 300 (e.g., a wireless communications system 300-*a* and a wireless communications system 300-*b*) that supports techniques for sharing usage cost information in accordance with one or more aspects of the present disclosure. In some cases, the wireless communications systems 300 may implement or be implemented by aspects of the wireless communications system 100, the wireless communications system 200, or both. For example, the wireless communications systems 300 may include one or more UEs 115 (e.g., a UE 115-*b* and a UE 115-*c*) and one or more network entities 105 (e.g., a network entity 105-*b* and a network entity 105-*c*), which may be examples of the corresponding devices as described herein.

In some wireless communications systems, such as the wireless communications system 300-*a* and the wireless communications system 300-*b*, a UE 115 may receive, from a network entity 105, a control message indicating (e.g., configuring) multiple candidate beams 310 for the UE 115. For example, the network entity 105-*b* may transmit, to the UE 115-*b*, a control message indicating a beam 310-*a* and a beam 310-*b*. Similarly, the network entity 105-*c* may transmit, to the UE 115-*c*, a control message indicating a beam 310-*c* and a beam 310-*d*. In such cases, the UE 115-*a* may be aware of (e.g., have prior knowledge of) link qualities, or other channel metrics, associated with each beam 310. For example, the UEs 115 may be Customer Premise Equipment (CPE) and may collect statistics associated with the link qualities of each beam 310 or the UEs 115 may use an Artificial Intelligence (AI) or Machine Learning (ML) model to generate predictions associated with the link qualities of each beam 310. As such, the UEs 115 may be aware of a quantity of CSI-RS repetitions associated with each beam 310. For example, a first beam 310 may be associated with no CSI-RS repetitions and a second beam 310 may be associated with at least one CSI-RS repetition. As such, if a UE 115 indicates at least one CSI-RS repetition to a network entity 105, additional signaling overhead may be generated for communications via the first beam (e.g., which does not rely on repetition). Conversely, if the UE 115 indicates no CSI-RS repetition to the network entity 105, the UE 115 may not be able to perform beamforming on the second beam. As such, communicating via different beams may result in different usage costs.

In another example, as depicted in the wireless communications system 300-*a*, the beam 310-*a* may be at least partially obstructed, or blocked, by a blockage 315. As such, transmissions via the beam 310-*a* may be associated with an increased rate of retransmissions, as compared to the beam 310-*b*. As such, a first configuration of the UE 115-*b* associated with communications via the beam 310-*a* may be associated with a different usage cost and a different performance than a second configuration of the UE 115-*b* associated with communications via the beam 310-*b*.

In another example, as depicted in the wireless communications system 300-*b*, a first configuration of the UE 115-*c* may support direct communications with the network entity 105-*c* via the beam 310-*c* and a second configuration of the UE 115-*c* may support indirect communications with the network entity 105-*c* via the beam 310-*d* (e.g., via an RIS 305). As such, a first configuration of the UE 115-*c* associated with communications via the beam 310-*c* may be associated with a different usage cost and a different performance than a second configuration of the UE 115-*c* associated with communications via the beam 310-*b*. For example, the UE 115-*c* may be associated with (e.g., include) multiple antenna panels to transmit and receive communications. As such, each antenna panel may be associated with different beams 310, such as a first antenna panel associated with the beam 310-*c* and a second antenna panel associated with the beam 310-*d* and may be associated with a different configuration of the UE 115-*c*. Thus, communicating via each beam 310 may result in different usage costs based on each beam 310 being associated with a different antenna panel, a different configuration of the UE 115-*c*, or both.

As such, each UE 115 may transmit a usage cost message indicating a usage cost associated with respective beams of the UE 115 (e.g., the usage cost message may be beam-specific). For example, the UE 115-*b* may transmit a usage cost message to the network entity 105-*b* indicating a first usage cost associated with the beam 310-*a* and a second usage cost associated with the beam 310-*b*. Similarly, the UE 115-*c* may transmit a usage cost message to the network entity 105-*c* a third usage cost associated with the beam 310-*c* and a fourth usage cost associated with the beam 310-*d*.

Additionally, or alternatively, the UEs 115 may indicate a quantity of beams 310 (e.g., maxNumberRxBeam) supported by the respective UE 115 in a beam-specific manner. That is, each beam 310 (e.g., from a network entity 105 to a UE 115) supported by the UE 115 may be associated with a codebook of the UE 115. As such, the UE 115 may transmit an indication of a usage cost associated with each beam 310, further indicating (e.g., implicitly) the usage cost associated with each codebook of the UE 115 (e.g., the usage cost message may be beam-specific, codebook-specific, or both). In such cases, the UE 115 may transmit the indication dynamically (e.g., as the beams 310 are prone to change unlike a semi-static capability indication).

Figure 4:
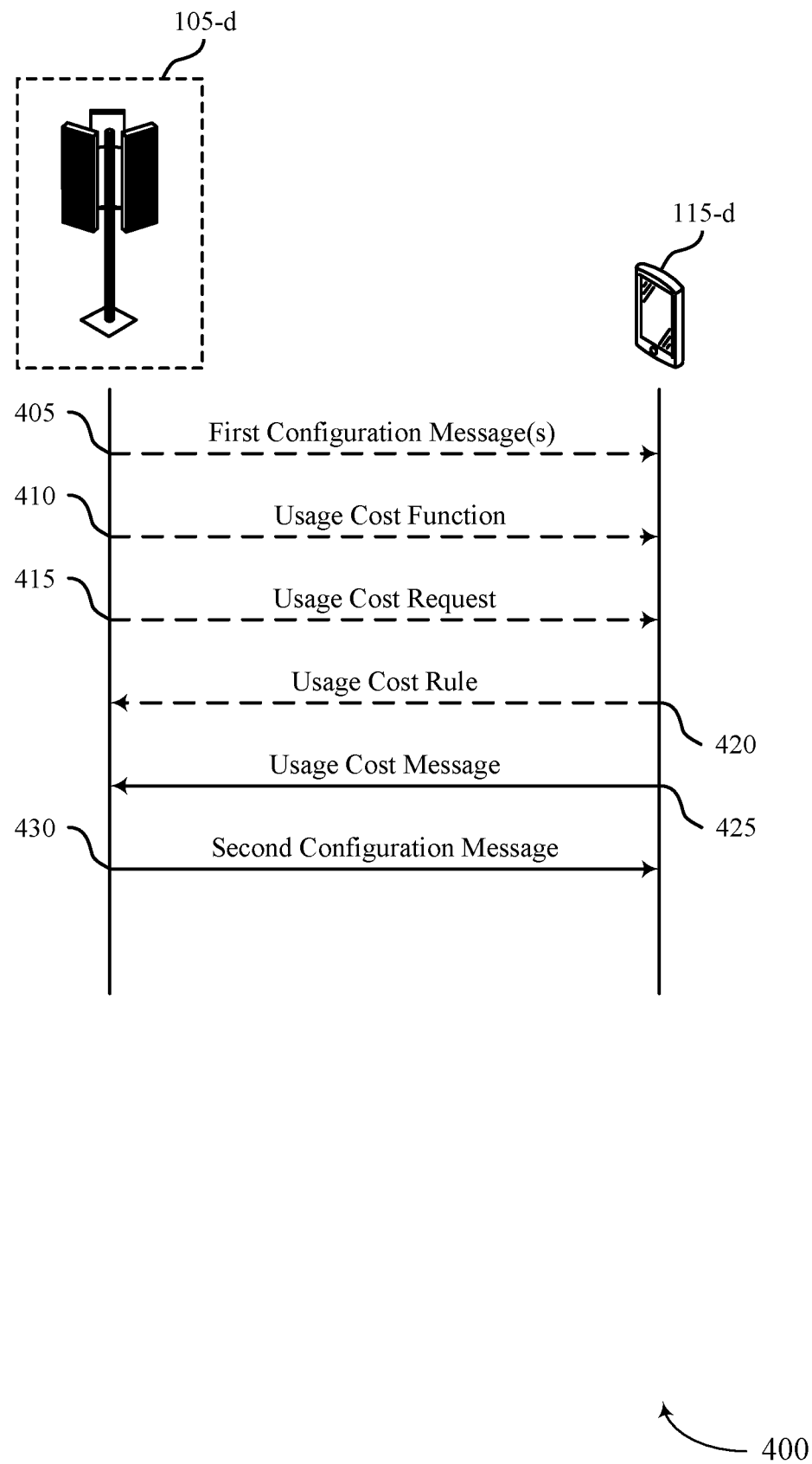
FIG. 4 shows an example of a process flow that supports techniques for sharing usage cost information in accordance with one or more aspects of the present disclosure.

FIG. 4 shows an example of a process flow 400 that supports techniques for sharing usage cost information in accordance with one or more aspects of the present disclosure. In some cases, the process flow 400 may implement or be implemented by aspects of the wireless communications system 100, the wireless communications system 200, the wireless communications systems 300, or any combination thereof. For example, the process flow 400 may include one or more UEs 115 (e.g., a UE 115-d) and one or more network entities 105 (e.g., a network entity 105-d), which may be examples of the corresponding devices as described herein.

In some examples, at 405, the UE 115-d may receive, from the network entity 105-d, one or more first configuration messages (e.g., one or more first control messages) indicating multiple configurations of the UE 115-d. That is, the one or more first configuration messages may indicate a first set of operating parameters for the UE 115-d and a second set of operating parameters for the UE 115-d, where the first set of operating parameters is different than the second set of operating parameters. Additionally, the one or more configuration messages (e.g., or an additional configuration message) may indicate a baseline set of operating parameters.

The first set of operating parameters may include a first quantity of receive beams and the second set of operating parameters may include a second quantity of receive beams. Additionally, each set of operating parameters (e.g., the first set of operating parameters and the second set of operating parameters) may include a quantity of codebooks, one or more sets of receive beam, one or more processing parameters, an ADC resolution, a digital power distortion, one or more beamforming parameters, a transmit power, a quantity of repetitions (e.g., CSI-RS repetitions), or any combination thereof.

In some cases, at 410, the UE 115-d may receive, from the network entity 105-d, a first indication of a usage cost function associated with calculating usage costs of each set of operating parameters supported by (e.g., configured for) the UE 115-d. In some examples, the first indication may be included in a second control message. For example, the UE 115-d may calculate a first usage cost associated with the first set of operating parameters and a second usage cost associated with the second set of operating parameters using the usage cost function.

Each of the first usage cost and the second usage cost may include a respective indication of a power consumption, a latency, a throughput, a level of interference, or any combination thereof. Additionally, or alternatively, each of the first usage cost and the second usage cost may be associated with the UE 115-d communicating according to a respective set of operating parameters, maintaining the respective set of operating parameters, training the UE 115-d according to the respective set of operating parameters, or any combination thereof. Additionally, or alternatively, each of the first usage cost and the second usage cost may include an absolute value of a respective usage cost or a relative value of the respective usage cost. For example, each of the first usage cost and the second usage cost may include a usage cost value relative to a baseline usage cost associated with the baseline set of operating parameters.

Additionally, or alternatively, the first usage cost and the second usage cost may be associated with transmitting one or more signals in accordance with the first set of operating parameters and the second set of operating parameters, respectively, are associated with receiving one or more signals in accordance with the first set of operating parameters and the second set of operating parameters, respectively, or both.

In some examples, at 415, the UE 115-d may receive, from the network entity 105-d, a request for the UE 115-d to provide usage costs associated with each set of operating parameters supported by the UE 115-d. In some examples, the request may be included in the second control message or may be included in a third control message.

In some examples, at 420, the UE 115-d may transmit, to the network entity 105-d, a second indication of a usage cost rule associated with communicating using beam sets. That is, the usage cost rule may define a relationship between the UE 115-d communicating using a single receive beam relative to the UE 115-d communicating via a beam set. That is, the first quantity of receive beams may be associated with a first beam set and the second quantity of receive beams may be associated with a second beam set, such that the first usage cost and the second usage cost are relative to a third usage cost associated with the UE 115-d communicating using a single receive beam based on the usage cost rule.

At 425, the UE 115-d may transmit, to the network entity 105-d, a usage cost message indicating the first usage cost associated with the first set of operating parameters and indicating the second usage cost associated with the second set of operating parameters. In such cases, the usage cost message may be transmitted semi-statically, semi-persistently, or dynamically.

In some examples, the usage cost message may include a third indication of multiple codebooks supported by the UE 115-d. For example, a first codebook of the multiple codebooks may be associated with both the first quantity of receive beams and the first usage cost, and a second codebook of the multiple codebooks may be associated with the second quantity of receive beams and the second usage cost. As such, the usage cost message may include an indication of the first codebook and the second codebook (e.g., as well as the respective usage costs).

In some examples, the first quantity of receive beams may be associated with a first antenna panel at the UE 115-d and the second quantity of receive beams may be associated with a second antenna panel at the UE 115-d, as such, the first usage cost may be based on the UE 115-d communicating using the first antenna panel and the second usage cost may be based on the UE 115-d communicating using the second antenna panels.

At 430, the UE 115-d may receive, from the network entity 105-d, a second configuration message (e.g., a fourth control message) indicating for the UE 115-d to operate according to one of the first set of operating parameters or the second set of operating parameters based on the first usage cost and the second usage cost.

In some examples (e.g., not depicted), the network entity 105-d may transmit, to an additional wireless device (e.g., an RIS), a third configuration message indicating for the additional wireless device to operate according to a third set of operating parameters based on the network entity 105-d indicating for the UE 115-d to operate according to one of the first set of operating parameters or the second set of operating parameters. In other words, the third set of operating parameters may be based on the indicated set of operating parameters (e.g., in the second configuration message).

Figure 5:
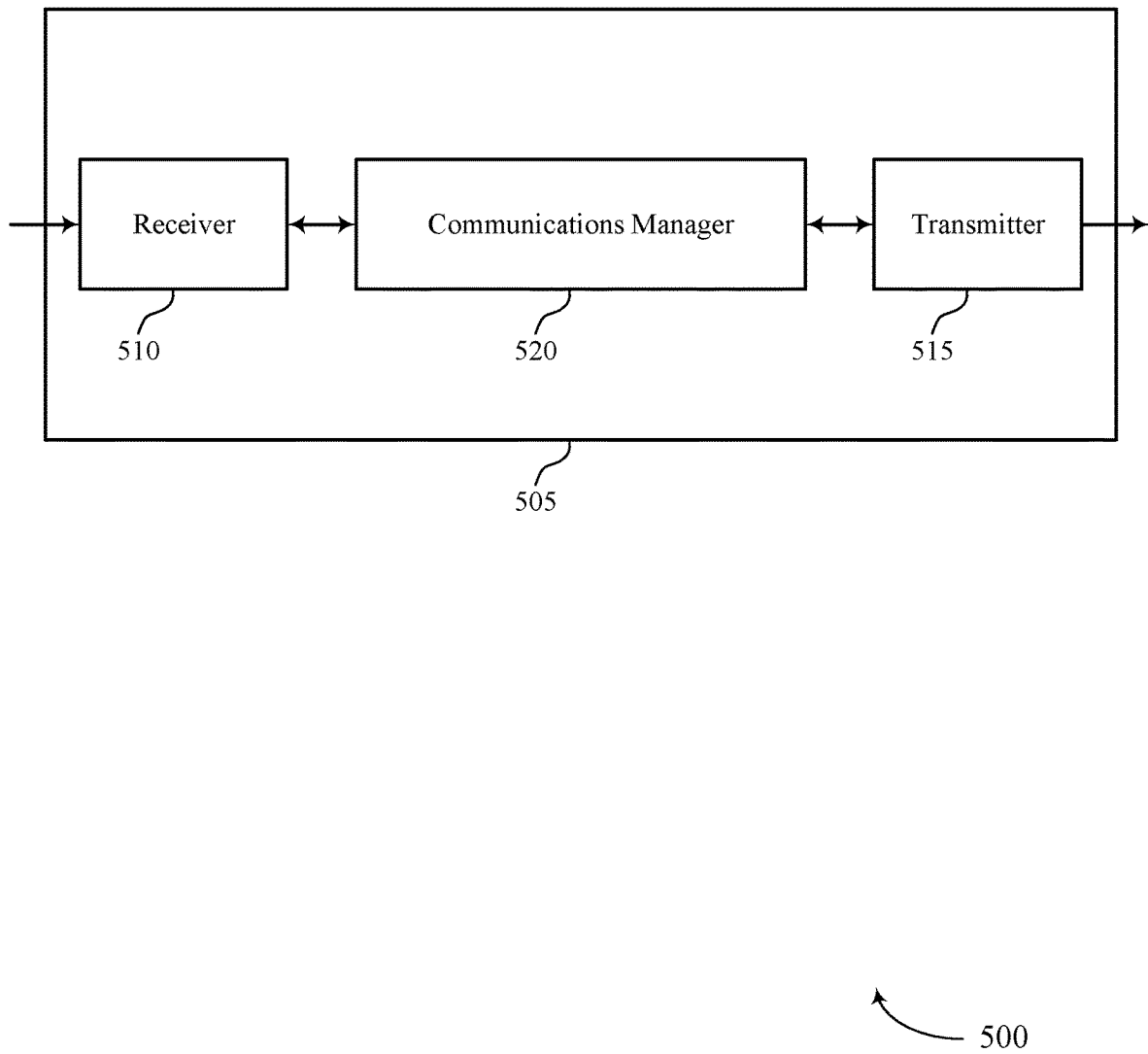
FIGS. 5 and 6 show block diagrams of devices that support techniques for sharing usage cost information in accordance with one or more aspects of the present disclosure.

FIG. 5 shows a block diagram 500 of a device 505 that supports techniques for sharing usage cost information in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sharing usage cost information). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sharing usage cost information). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sharing usage cost information as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a wireless device in accordance with examples as disclosed herein. For example, the communications manager 520 is capable of, configured to, or operable to support a means for transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The communications manager 520 is capable of, configured to, or operable to support a means for receiving an indication for the wireless device to operate according to one of the first set of operating parameters or the second set of operating parameters based on the first usage cost and the second usage cost.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for transmitting usage costs associated with each configuration of a wireless device which may result in reduced processing, reduced power consumption, and more efficient utilization of communication resources, among other advantages.

Figure 6:
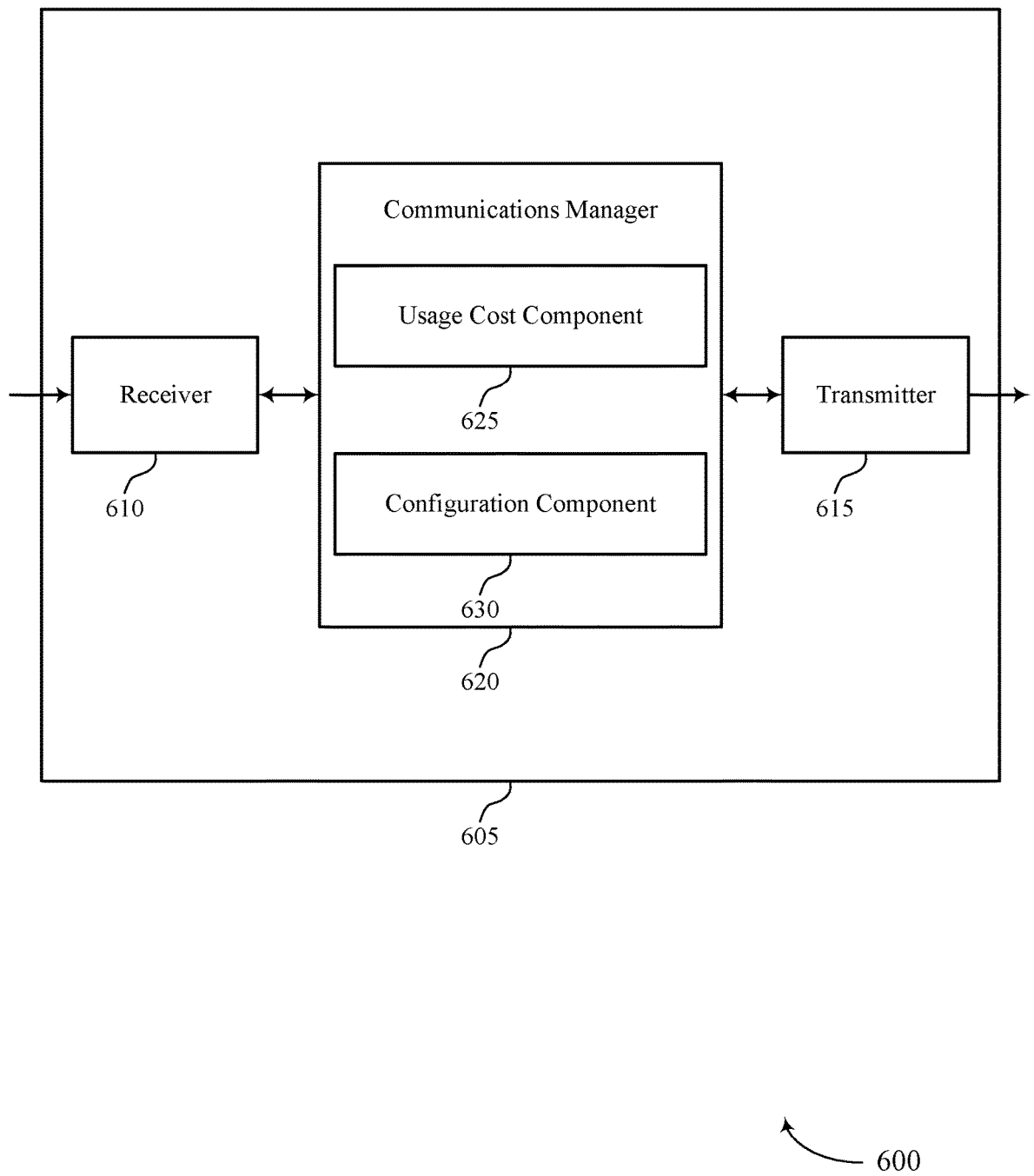

FIG. 6 shows a block diagram 600 of a device 605 that supports techniques for sharing usage cost information in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sharing usage cost information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sharing usage cost information). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sharing usage cost information as described herein. For example, the communications manager 620 may include a usage cost component 625 a configuration component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a wireless device in accordance with examples as disclosed herein. The usage cost component 625 is capable of, configured to, or operable to support a means for transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The configuration component 630 is capable of, configured to, or operable to support a means for receiving an indication for the wireless device to operate according to one of the first set of operating parameters or the second set of operating parameters based on the first usage cost and the second usage cost.

Figure 7:
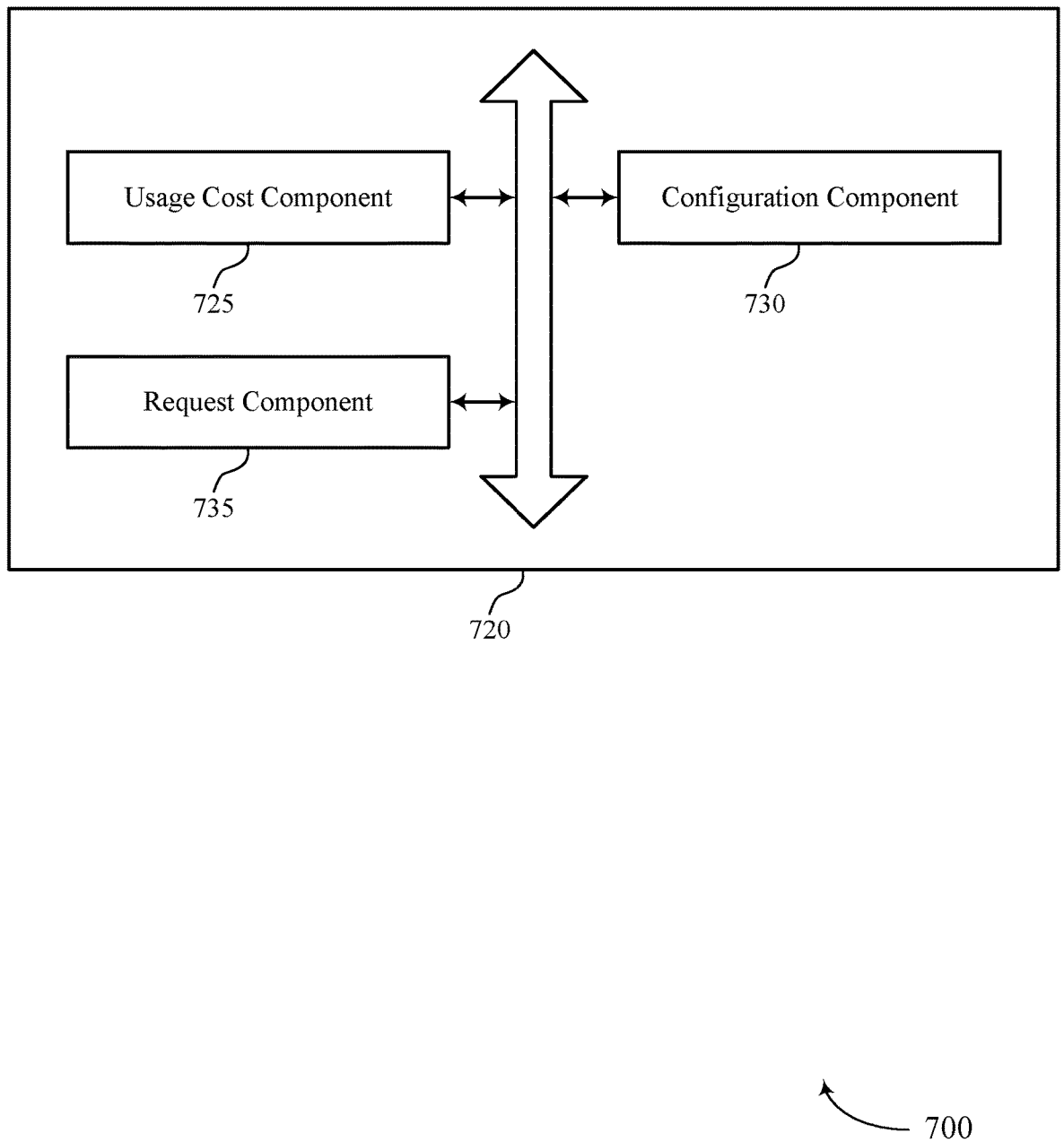
FIG. 7 shows a block diagram of a communications manager that supports techniques for sharing usage cost information in accordance with one or more aspects of the present disclosure.

FIG. 7 shows a block diagram 700 of a communications manager 720 that supports techniques for sharing usage cost information in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for sharing usage cost information as described herein. For example, the communications manager 720 may include a usage cost component 725, a configuration component 730, a request component 735, or any combination thereof. Each of these components, or components or subcomponents thereof (e.g., one or more processors, one or more memories), may communicate, directly or indirectly, with one another (e.g., via one or more buses).

The communications manager 720 may support wireless communications at a wireless device in accordance with examples as disclosed herein. The usage cost component 725 is capable of, configured to, or operable to support a means for transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The configuration component 730 is capable of, configured to, or operable to support a means for receiving an indication for the wireless device to operate according to one of the first set of operating parameters or the second set of operating parameters based on the first usage cost and the second usage cost.

In some examples, the usage cost component 725 is capable of, configured to, or operable to support a means for receiving a second indication of a usage cost function associated with calculating usage costs, where the first usage cost and the second usage cost are based on the usage cost function.

In some examples, to support transmitting the usage cost message, the usage cost component 725 is capable of, configured to, or operable to support a means for transmitting a second indication of a set of multiple codebooks supported by the wireless device, where a first codebook of the set of multiple codebooks is associated with both the first quantity of receive beams and the first usage cost, where a second codebook of the set of multiple codebooks is associated with both the second quantity of receive beams and the second usage cost, and where the usage cost message includes the second indication of the set of multiple codebooks.

In some examples, the request component 735 is capable of, configured to, or operable to support a means for receiving a request for the wireless device to provide usage costs associated with each set of operating parameters supported by the wireless device including at least the first set of operating parameters and the second set of operating parameters, where transmitting the usage cost message is based on receiving the request.

In some examples, the configuration component 730 is capable of, configured to, or operable to support a means for receiving one or more control signals indicating the first set of operating parameters and the second set of operating parameters, where transmitting the usage cost message is based on receiving the one or more control signals.

In some examples, the usage cost component 725 is capable of, configured to, or operable to support a means for transmitting a second indication of a usage cost rule associated with communicating using beam sets, where the first usage cost and the second usage cost are relative to a third usage cost associated with communicating using a single receive beam based on the usage cost rule.

In some examples, the first quantity of receive beams is associated with a first beam set and the second quantity of receive beams is associated with a second beam set. In some examples, the first usage cost and the second usage cost are based on communicating using the first beam set and the second beam set, respectively.

In some examples, the first quantity of receive beams is associated with a first antenna panel at the wireless device and the second quantity of receive beams is associated with a second antenna panel at the wireless device. In some examples, the first usage cost is based on communicating using the first antenna panel. In some examples, the second usage cost is based on communicating using the second antenna panel.

In some examples, each set of operating parameters includes a quantity of codebooks, one or more sets of receive beam, one or more processing parameters, an analog to digital converter resolution, a digital power distortion, one or more beamforming parameters, a transmit power, a quantity of repetitions, or any combination thereof.

In some examples, each of the first usage cost and the second usage cost includes a respective indication of a power consumption, a latency, a throughput, a level of interference, or any combination thereof.

In some examples, each of the first usage cost and the second usage cost is associated with communicating according to a respective set of operating parameters, maintaining the respective set of operating parameters, training the wireless device according to the respective set of operating parameters, or any combination thereof.

In some examples, each of the first usage cost and the second usage cost includes an absolute value of a respective usage cost or a relative value of the respective usage cost.

In some examples, the configuration component 730 is capable of, configured to, or operable to support a means for receiving a second indication of a baseline set of operating parameters, where the first usage cost and the second usage cost are relative to a baseline usage cost associated with the baseline set of operating parameters.

In some examples, the usage cost message is transmitted semi-statically, semi-persistently, or dynamically.

In some examples, the first usage cost and the second usage cost are associated with transmitting one or more signals in accordance with the first set of operating parameters and the second set of operating parameters, respectively, are associated with receiving one or more signals in accordance with the first set of operating parameters and the second set of operating parameters, respectively, or both.

Figure 8:
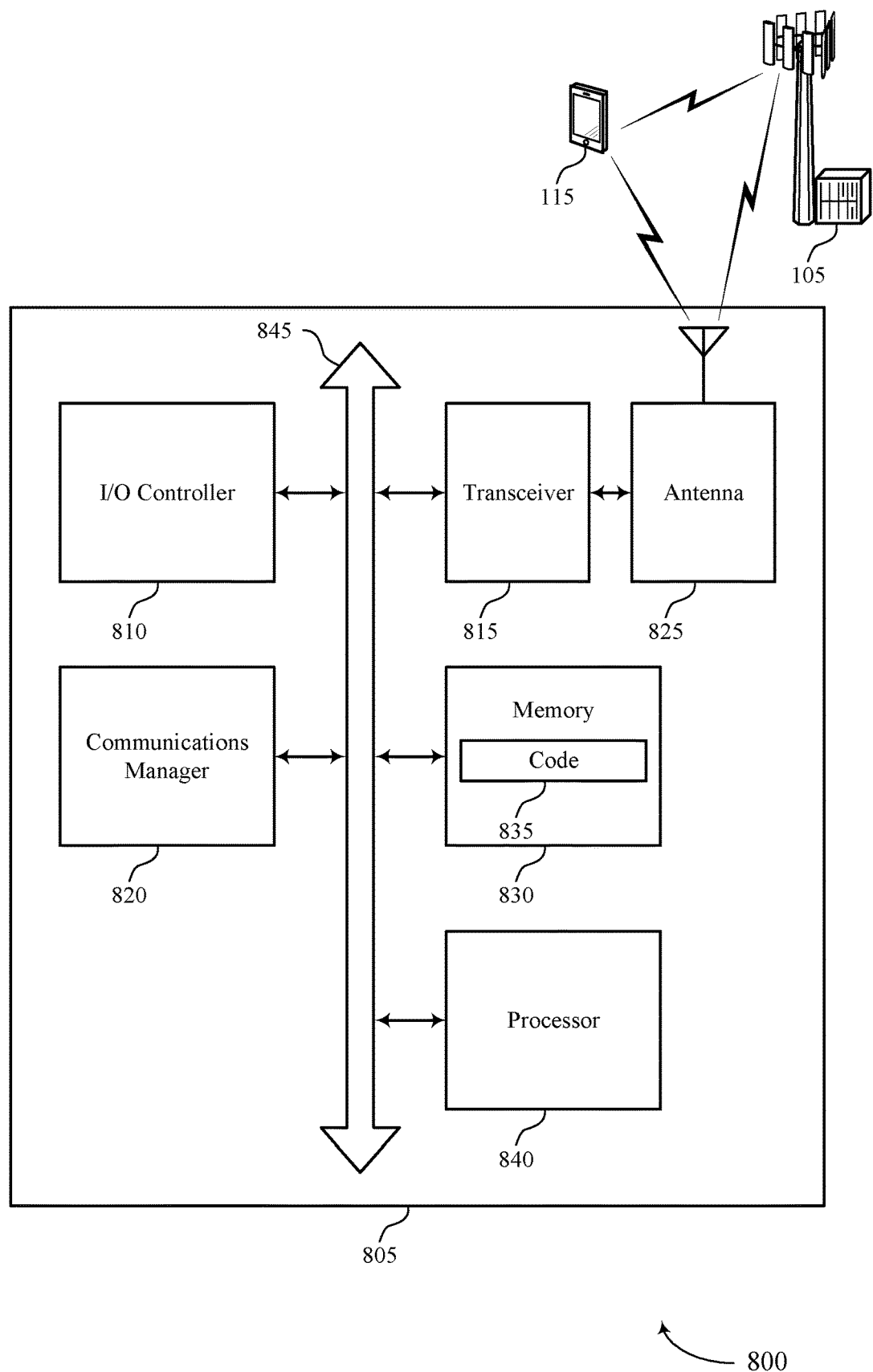
FIG. 8 shows a diagram of a system including a device that supports techniques for sharing usage cost information in accordance with one or more aspects of the present disclosure.

FIG. 8 shows a diagram of a system 800 including a device 805 that supports techniques for sharing usage cost information in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for sharing usage cost information). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a wireless device in accordance with examples as disclosed herein. For example, the communications manager 820 is capable of, configured to, or operable to support a means for transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The communications manager 820 is capable of, configured to, or operable to support a means for receiving an indication for the wireless device to operate according to one of the first set of operating parameters or the second set of operating parameters based on the first usage cost and the second usage cost.

By including or configuring the communications manager 820 in accordance with examples as described herein, the device 805 may support techniques for transmitting usage costs associated with each configuration of a wireless device which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for sharing usage cost information as described herein, or the at least one processor 840 and the at least one memory 830 may be otherwise configured to, individually or collectively, perform or support such operations.

Figure 9:
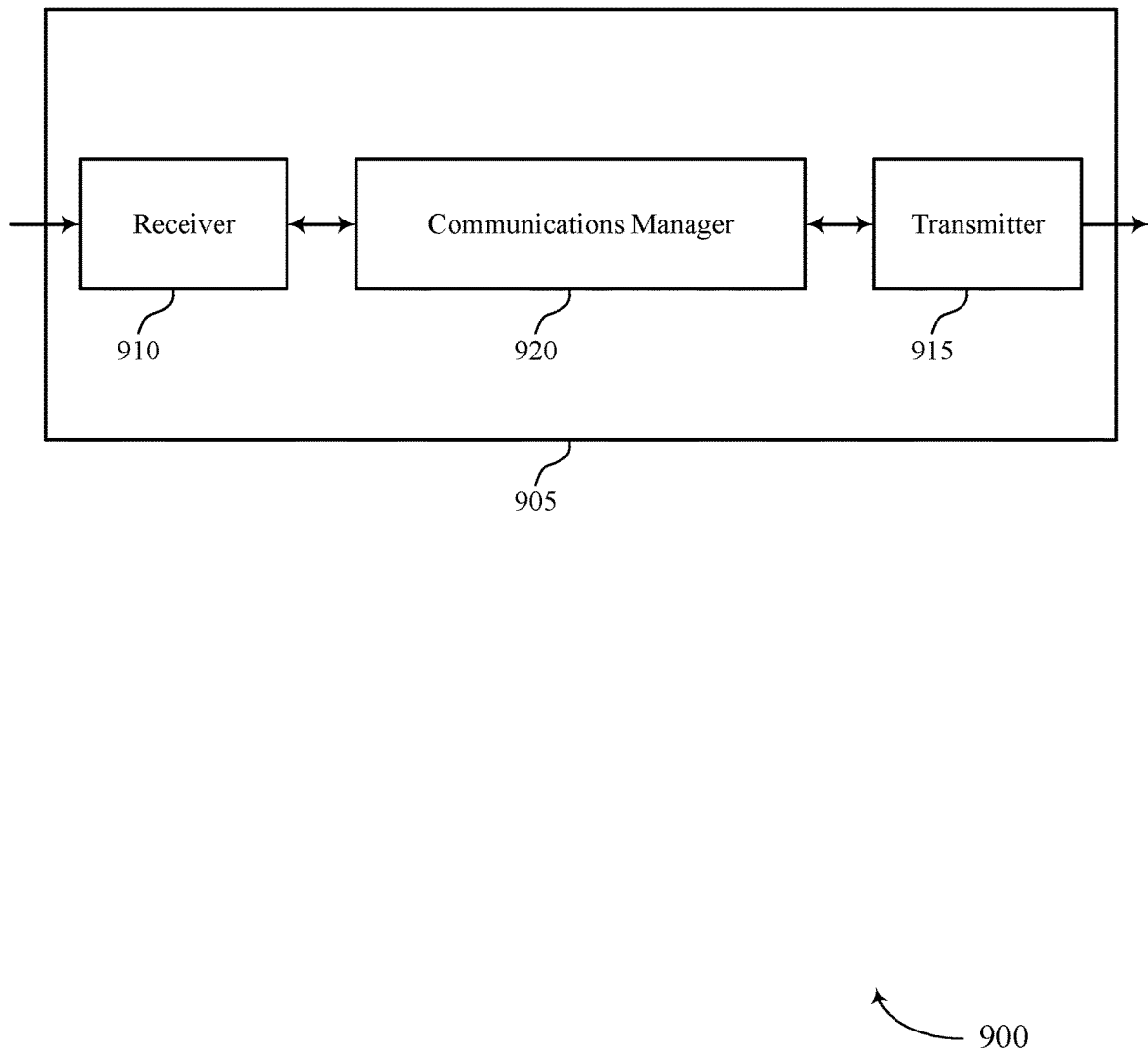
FIGS. 9 and 10 show block diagrams of devices that support techniques for sharing usage cost information in accordance with one or more aspects of the present disclosure.

FIG. 9 shows a block diagram 900 of a device 905 that supports techniques for sharing usage cost information in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for sharing usage cost information as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The communications manager 920 is capable of, configured to, or operable to support a means for transmitting an indication for the wireless device to operate according to one of the first set of operating parameters or the second set of operating parameters based on the first usage cost and the second usage cost.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for transmitting usage costs associated with each configuration of a wireless device which may result in reduced processing, reduced power consumption, and more efficient utilization of communication resources, among other advantages.

Figure 10:
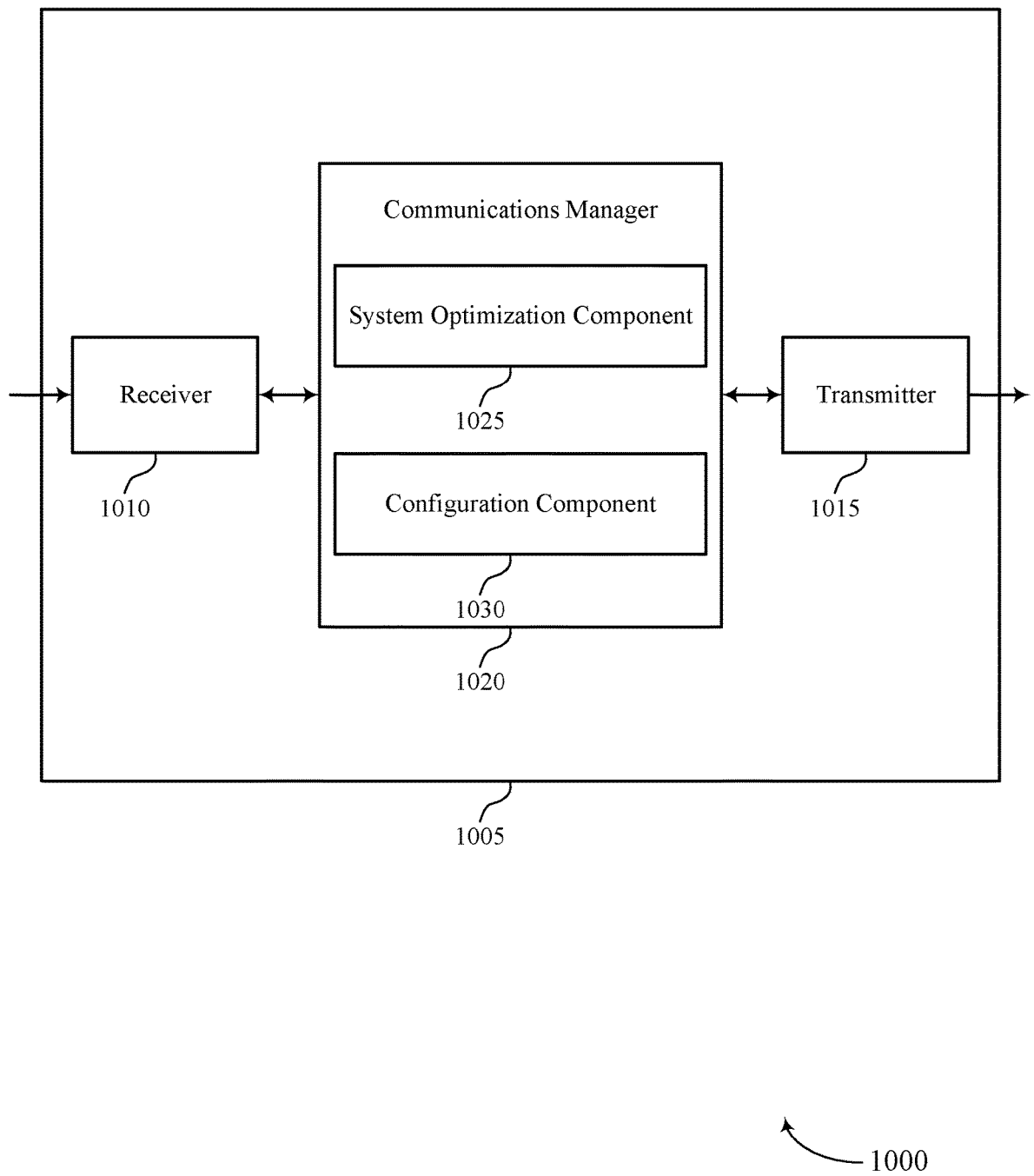

FIG. 10 shows a block diagram 1000 of a device 1005 that supports techniques for sharing usage cost information in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for sharing usage cost information as described herein. For example, the communications manager 1020 may include a system optimization component 1025 a configuration component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The system optimization component 1025 is capable of, configured to, or operable to support a means for receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The configuration component 1030 is capable of, configured to, or operable to support a means for transmitting an indication for the wireless device to operate according to one of the first set of operating parameters or the second set of operating parameters based on the first usage cost and the second usage cost.

Figure 11:
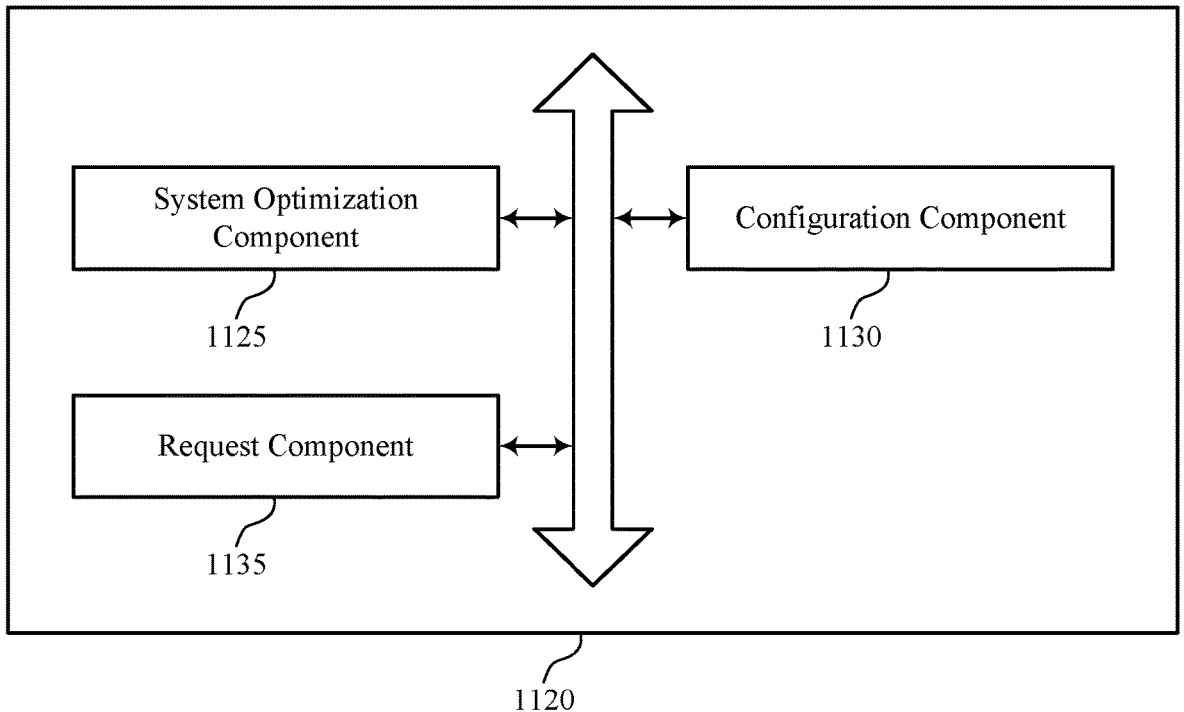
FIG. 11 shows a block diagram of a communications manager that supports techniques for sharing usage cost information in accordance with one or more aspects of the present disclosure.

FIG. 11 shows a block diagram 1100 of a communications manager 1120 that supports techniques for sharing usage cost information in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for sharing usage cost information as described herein. For example, the communications manager 1120 may include a system optimization component 1125, a configuration component 1130, a request component 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The system optimization component 1125 is capable of, configured to, or operable to support a means for receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The configuration component 1130 is capable of, configured to, or operable to support a means for transmitting an indication for the wireless device to operate according to one of the first set of operating parameters or the second set of operating parameters based on the first usage cost and the second usage cost.

In some examples, the configuration component 1130 is capable of, configured to, or operable to support a means for transmitting a second indication of a usage cost function associated with calculating usage costs, where the first usage cost and the second usage cost are based on the usage cost function.

In some examples, the system optimization component 1125 is capable of, configured to, or operable to support a means for receiving a second indication of a set of multiple codebooks supported by the wireless device, where a first codebook of the set of multiple codebooks is associated with both the first quantity of receive beams and the first usage cost, and where a second codebook of the set of multiple codebooks is associated with both the second quantity of receive beams and the second usage cost, and where the usage cost message includes the second indication of the set of multiple codebooks.

In some examples, the request component 1135 is capable of, configured to, or operable to support a means for transmitting a request for the wireless device to provide usage costs associated with each set of operating parameters supported by the wireless device including at least the first set of operating parameters and the second set of operating parameters, where transmitting the usage cost message is based on receiving the request.

In some examples, the configuration component 1130 is capable of, configured to, or operable to support a means for transmitting one or more control signals indicating the first set of operating parameters and the second set of operating parameters, where transmitting the usage cost message is based on receiving the one or more control signals.

In some examples, the system optimization component 1125 is capable of, configured to, or operable to support a means for receiving a second indication of a usage cost rule associated with communicating using beam sets, where the first usage cost and the second usage cost are relative to a third usage cost associated with communicating using a single receive beam based on the usage cost rule.

In some examples, the first quantity of receive beams is associated with a first beam set and the second quantity of receive beams is associated with a second beam set. In some examples, the first usage cost and the second usage cost are based on communicating using the first beam set and the second beam set, respectively.

In some examples, the indication is associated with the wireless device operating according to the first set of operating parameters, and the configuration component 1130 is capable of, configured to, or operable to support a means for transmitting, to a second wireless device, one or more control signals indicating a third set of operating parameters based on the first set of operating parameters.

In some examples, the first set of operating parameters is associated with the network entity communicating with the wireless device via the second wireless device.

In some examples, the first quantity of receive beams is associated with a first antenna panel at the wireless device and the second quantity of receive beams is associated with a second antenna panel at the wireless device. In some examples, the first usage cost and the second usage cost are based on communicating using the first antenna panel and the second antenna panel, respectively.

In some examples, each set of operating parameters includes a quantity of codebooks, one or more sets of receive beam, one or more processing parameters, an analog to digital converter resolution, a digital power distortion, one or more beamforming parameters, a transmit power, a quantity of repetitions, or any combination thereof.

In some examples, each of the first usage cost and the second usage cost includes a respective indication of a power consumption, a latency, a throughput, a level of interference, or any combination thereof.

In some examples, each of the first usage cost and the second usage cost is associated with the wireless device communicating according to a respective set of operating parameters, maintaining the respective set of operating parameters, training the wireless device according to the respective set of operating parameters, or any combination thereof.

In some examples, each of the first usage cost and the second usage cost includes an absolute value of a respective usage cost or a relative value of the respective usage cost.

In some examples, the configuration component 1130 is capable of, configured to, or operable to support a means for transmitting a second indication of a baseline set of operating parameters, where the first usage cost and the second usage cost are relative to a baseline usage cost associated with the baseline set of operating parameters.

In some examples, the usage cost message is received semi-statically, semi-persistently, or dynamically.

Figure 12:
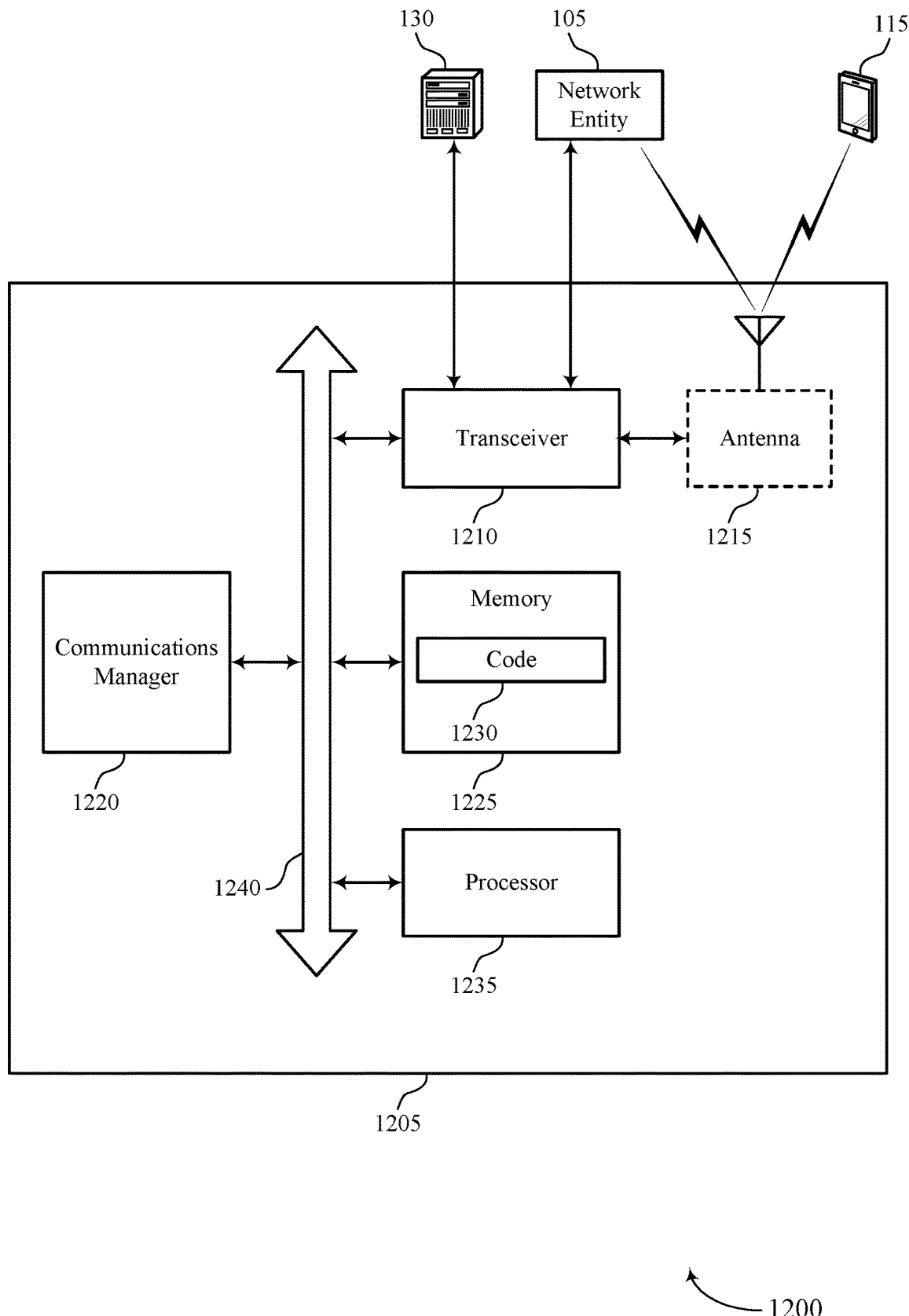
FIG. 12 shows a diagram of a system including a device that supports techniques for sharing usage cost information in accordance with one or more aspects of the present disclosure.

FIG. 12 shows a diagram of a system 1200 including a device 1205 that supports techniques for sharing usage cost information in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for sharing usage cost information). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The communications manager 1220 is capable of, configured to, or operable to support a means for transmitting an indication for the wireless device to operate according to one of the first set of operating parameters or the second set of operating parameters based on the first usage cost and the second usage cost.

By including or configuring the communications manager 1220 in accordance with examples as described herein, the device 1205 may support techniques for transmitting usage costs associated with each configuration of a wireless device which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for sharing usage cost information as described herein, or the at least one processor 1235 and the at least one memory 1225 may be otherwise configured to, individually or collectively, perform or support such operations.

Figure 13:
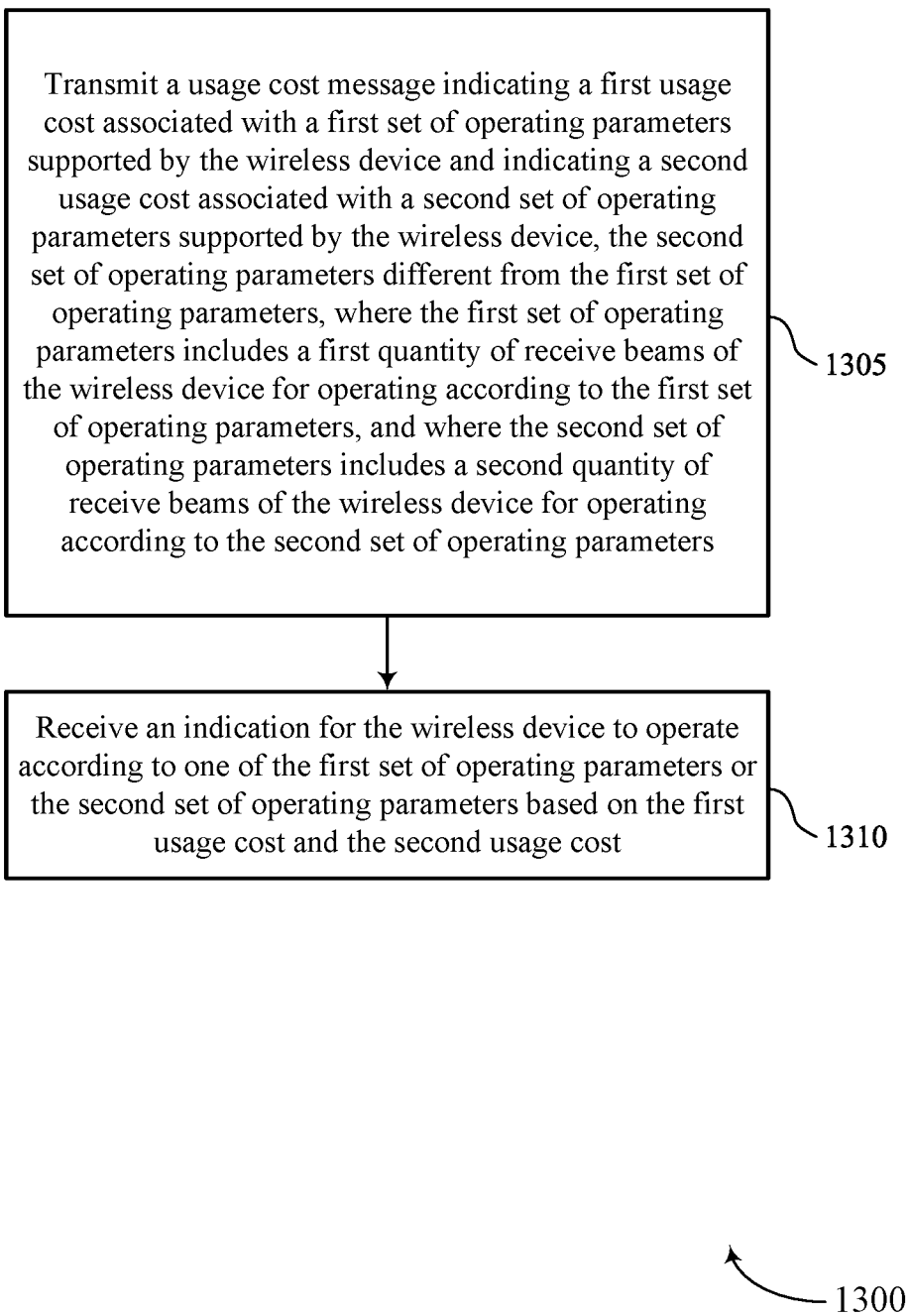
FIGS. 13 through 15 show flowcharts illustrating methods that support techniques for sharing usage cost information in accordance with one or more aspects of the present disclosure.

FIG. 13 shows a flowchart illustrating a method 1300 that supports techniques for sharing usage cost information in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The operations of block 1305 may be performed in accordance with examples as disclosed herein. In some examples, aspects of the operations of 1305 may be performed by a usage cost component 725 as described with reference to FIG. 7.

At 1310, the method may include receiving an indication for the wireless device to operate according to one of the first set of operating parameters or the second set of operating parameters based on the first usage cost and the second usage cost. The operations of block 1310 may be performed in accordance with examples as disclosed herein. In some examples, aspects of the operations of 1310 may be performed by a configuration component 730 as described with reference to FIG. 7.

Figure 14:
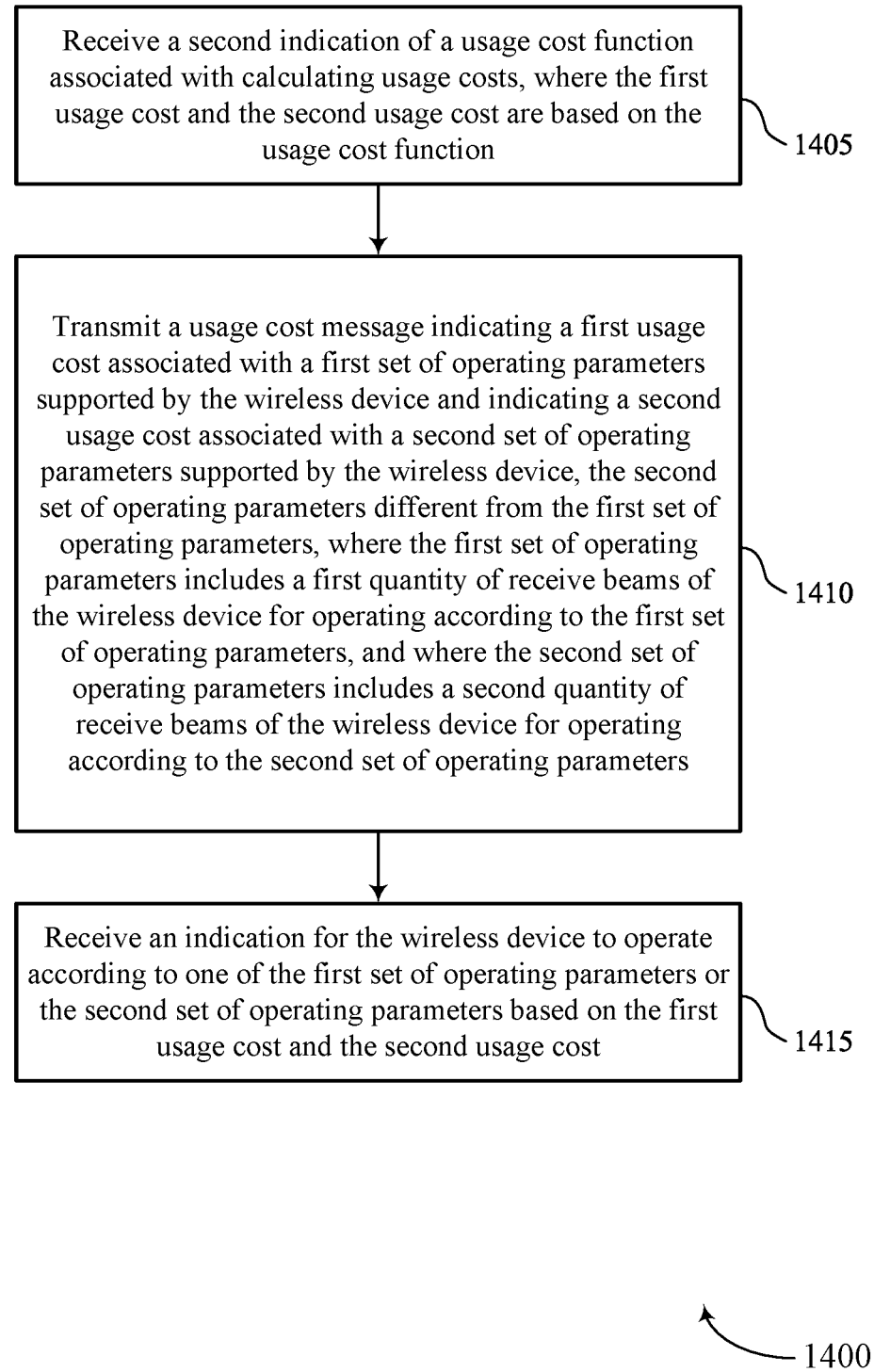

FIG. 14 shows a flowchart illustrating a method 1400 that supports techniques for sharing usage cost information in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a second indication of a usage cost function associated with calculating usage costs, where the first usage cost and the second usage cost are based on the usage cost function. The operations of block 1405 may be performed in accordance with examples as disclosed herein. In some examples, aspects of the operations of 1405 may be performed by a usage cost component 725 as described with reference to FIG. 7.

At 1410, the method may include transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The operations of block 1410 may be performed in accordance with examples as disclosed herein. In some examples, aspects of the operations of 1410 may be performed by a usage cost component 725 as described with reference to FIG. 7.

At 1415, the method may include receiving an indication for the wireless device to operate according to one of the first set of operating parameters or the second set of operating parameters based on the first usage cost and the second usage cost. The operations of block 1415 may be performed in accordance with examples as disclosed herein. In some examples, aspects of the operations of 1415 may be performed by a configuration component 730 as described with reference to FIG. 7.

Figure 15:
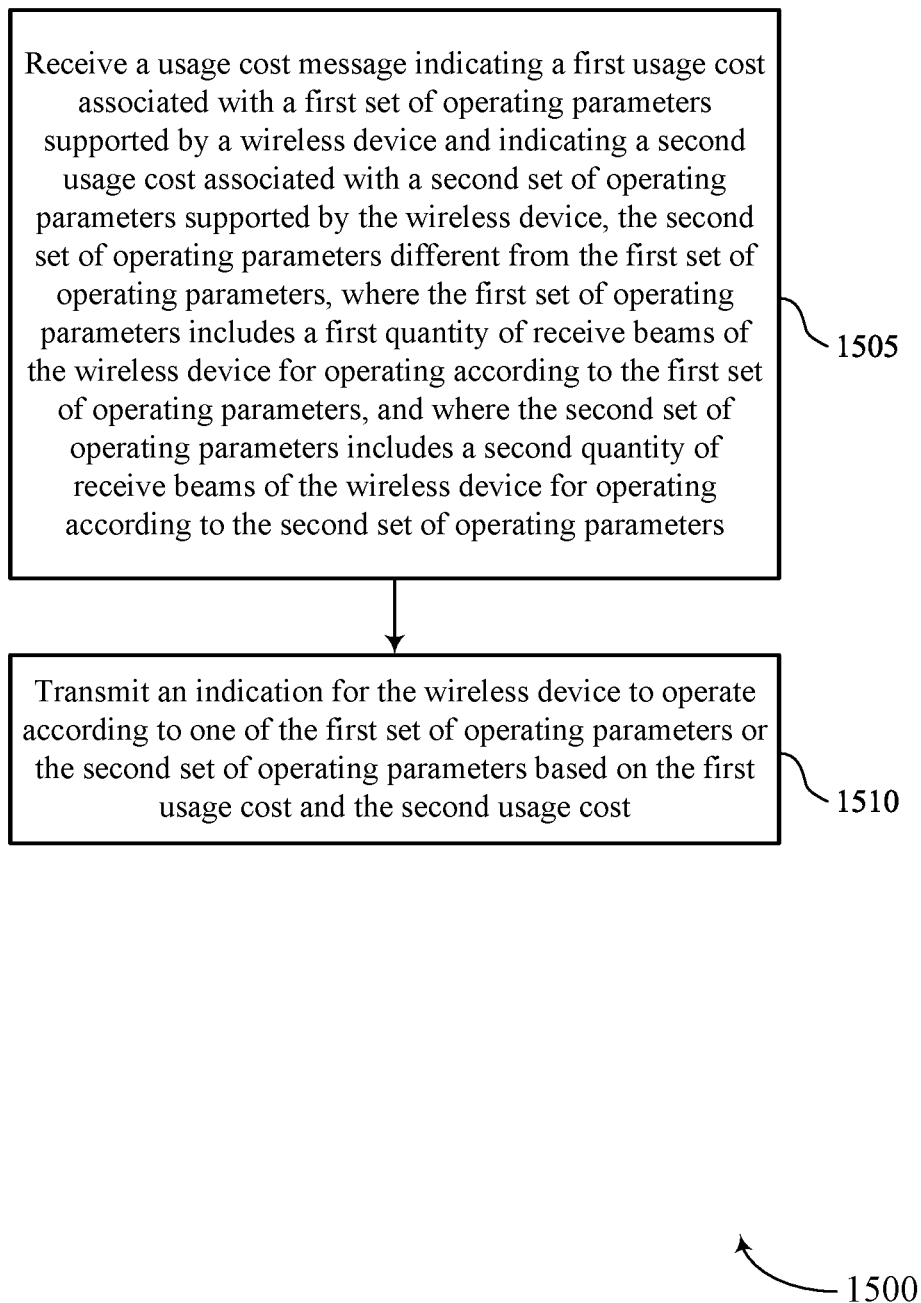

FIG. 15 shows a flowchart illustrating a method 1500 that supports techniques for sharing usage cost information in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, where the first set of operating parameters includes a first quantity of receive beams of the wireless device for operating according to the first set of operating parameters, and where the second set of operating parameters includes a second quantity of receive beams of the wireless device for operating according to the second set of operating parameters. The operations of block 1505 may be performed in accordance with examples as disclosed herein. In some examples, aspects of the operations of 1505 may be performed by a system optimization component 1125 as described with reference to FIG. 11.

At 1510, the method may include transmitting an indication for the wireless device to operate according to one of the first set of operating parameters or the second set of operating parameters based on the first usage cost and the second usage cost. The operations of block 1510 may be performed in accordance with examples as disclosed herein. In some examples, aspects of the operations of 1510 may be performed by a configuration component 1130 as described with reference to FIG. 11.

The following provides an overview of aspects of the present disclosure:

Aspect 1: A method for wireless communications at a wireless device, comprising: transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and receiving an indication for the wireless device to operate according to one of the first set of operating parameters or the second set of operating parameters based at least in part on the first usage cost and the second usage cost.

Aspect 2: The method of aspect 1, further comprising: receiving a second indication of a usage cost function associated with calculating usage costs, wherein the first usage cost and the second usage cost are based at least in part on the usage cost function.

Aspect 3: The method of any of aspects 1 through 2, wherein transmitting the usage cost message comprises: transmitting a second indication of a plurality of codebooks supported by the wireless device, wherein a first codebook of the plurality of codebooks is associated with both the first quantity of receive beams and the first usage cost, wherein a second codebook of the plurality of codebooks is associated with both the second quantity of receive beams and the second usage cost, and wherein the usage cost message comprises the second indication of the plurality of codebooks.

Aspect 4: The method of any of aspects 1 through 3, further comprising: receiving a request for the wireless device to provide usage costs associated with each set of operating parameters supported by the wireless device including at least the first set of operating parameters and the second set of operating parameters, wherein transmitting the usage cost message is based at least in part on receiving the request.

Aspect 5: The method of any of aspects 1 through 4, further comprising: receiving one or more control signals indicating the first set of operating parameters and the second set of operating parameters, wherein transmitting the usage cost message is based at least in part on receiving the one or more control signals.

Aspect 6: The method of any of aspects 1 through 5, further comprising: transmitting a second indication of a usage cost rule associated with communicating using beam sets, wherein the first usage cost and the second usage cost are relative to a third usage cost associated with communicating using a single receive beam based at least in part on the usage cost rule.

Aspect 7: The method of aspect 6, wherein the first quantity of receive beams is associated with a first beam set and the second quantity of receive beams is associated with a second beam set, and the first usage cost and the second usage cost are based at least in part on communicating using the first beam set and the second beam set, respectively.

Aspect 8: The method of any of aspects 1 through 7, wherein the first quantity of receive beams is associated with a first antenna panel at the wireless device and the second quantity of receive beams is associated with a second antenna panel at the wireless device, the first usage cost is based at least in part on communicating using the first antenna panel, and the second usage cost is based at least in part on communicating using the second antenna panel.

Aspect 9: The method of any of aspects 1 through 8, wherein each set of operating parameters comprises a quantity of codebooks, one or more sets of receive beam, one or more processing parameters, an analog to digital converter resolution, a digital power distortion, one or more beamforming parameters, a transmit power, a quantity of repetitions, or any combination thereof.

Aspect 10: The method of any of aspects 1 through 9, wherein each of the first usage cost and the second usage cost comprises a respective indication of a power consumption, a latency, a throughput, a level of interference, or any combination thereof.

Aspect 11: The method of any of aspects 1 through 10, wherein each of the first usage cost and the second usage cost is associated with communicating according to a respective set of operating parameters, maintaining the respective set of operating parameters, training the wireless device according to the respective set of operating parameters, or any combination thereof.

Aspect 12: The method of any of aspects 1 through 11, wherein each of the first usage cost and the second usage cost comprises an absolute value of a respective usage cost or a relative value of the respective usage cost.

Aspect 13: The method of aspect 12, further comprising: receiving a second indication of a baseline set of operating parameters, wherein the first usage cost and the second usage cost are relative to a baseline usage cost associated with the baseline set of operating parameters.

Aspect 14: The method of any of aspects 1 through 13, wherein the usage cost message is transmitted semi-statically, semi-persistently, or dynamically.

Aspect 15: The method of any of aspects 1 through 14, wherein the first usage cost and the second usage cost are associated with transmitting one or more signals in accordance with the first set of operating parameters and the second set of operating parameters, respectively, are associated with receiving one or more signals in accordance with the first set of operating parameters and the second set of operating parameters, respectively, or both.

Aspect 16: A method for wireless communications at a network entity, comprising: receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and transmitting an indication for the wireless device to operate according to one of the first set of operating parameters or the second set of operating parameters based at least in part on the first usage cost and the second usage cost.

Aspect 17: The method of aspect 16, further comprising: transmitting a second indication of a usage cost function associated with calculating usage costs, wherein the first usage cost and the second usage cost are based at least in part on the usage cost function.

Aspect 18: The method of any of aspects 16 through 17, further comprising: receiving a second indication of a plurality of codebooks supported by the wireless device, wherein a first codebook of the plurality of codebooks is associated with both the first quantity of receive beams and the first usage cost, and wherein a second codebook of the plurality of codebooks is associated with both the second quantity of receive beams and the second usage cost, and wherein the usage cost message comprises the second indication of the plurality of codebooks.

Aspect 19: The method of any of aspects 16 through 18, further comprising: transmitting a request for the wireless device to provide usage costs associated with each set of operating parameters supported by the wireless device including at least the first set of operating parameters and the second set of operating parameters, wherein transmitting the usage cost message is based at least in part on receiving the request.

Aspect 20: The method of any of aspects 16 through 19, further comprising: transmitting one or more control signals indicating the first set of operating parameters and the second set of operating parameters, wherein transmitting the usage cost message is based at least in part on receiving the one or more control signals.

Aspect 21: The method of any of aspects 16 through 20, further comprising: receiving a second indication of a usage cost rule associated with communicating using beam sets, wherein the first usage cost and the second usage cost are relative to a third usage cost associated with communicating using a single receive beam based at least in part on the usage cost rule.

Aspect 22: The method of aspect 21, wherein the first quantity of receive beams is associated with a first beam set and the second quantity of receive beams is associated with a second beam set, and the first usage cost and the second usage cost are based at least in part on communicating using the first beam set and the second beam set, respectively.

Aspect 23: The method of any of aspects 16 through 22, wherein the indication is associated with the wireless device operating according to the first set of operating parameters, the method further comprising: transmitting, to a second wireless device, one or more control signals indicating a third set of operating parameters based at least in part on the first set of operating parameters.

Aspect 24: The method of aspect 23, wherein the first set of operating parameters is associated with the network entity communicating with the wireless device via the second wireless device.

Aspect 25: The method of any of aspects 16 through 24, wherein the first quantity of receive beams is associated with a first antenna panel at the wireless device and the second quantity of receive beams is associated with a second antenna panel at the wireless device, and the first usage cost and the second usage cost are based at least in part on communicating using the first antenna panel and the second antenna panel, respectively.

Aspect 26: The method of any of aspects 16 through 25, wherein each set of operating parameters comprises a quantity of codebooks, one or more sets of receive beam, one or more processing parameters, an analog to digital converter resolution, a digital power distortion, one or more beamforming parameters, a transmit power, a quantity of repetitions, or any combination thereof.

Aspect 27: The method of any of aspects 16 through 26, wherein each of the first usage cost and the second usage cost comprises a respective indication of a power consumption, a latency, a throughput, a level of interference, or any combination thereof.

Aspect 28: The method of any of aspects 16 through 27, wherein each of the first usage cost and the second usage cost is associated with the wireless device communicating according to a respective set of operating parameters, maintaining the respective set of operating parameters, training the wireless device according to the respective set of operating parameters, or any combination thereof.

Aspect 29: The method of any of aspects 16 through 28, wherein each of the first usage cost and the second usage cost comprises an absolute value of a respective usage cost or a relative value of the respective usage cost.

Aspect 30: The method of aspect 29, further comprising: transmitting a second indication of a baseline set of operating parameters, wherein the first usage cost and the second usage cost are relative to a baseline usage cost associated with the baseline set of operating parameters.

Aspect 31: The method of any of aspects 16 through 30, wherein the usage cost message is received semi-statically, semi-persistently, or dynamically.

Aspect 32: A wireless device for wireless communications, comprising one or more memories storing processor-executable code, and one or more processors coupled with the one or more memories and individually or collectively operable to execute the code to cause the wireless device to perform a method of any of aspects 1 through 15.

Aspect 33: A wireless device for wireless communications, comprising at least one means for performing a method of any of aspects 1 through 15.

Aspect 34: A non-transitory computer-readable medium storing code for wireless communications, the code comprising instructions executable by a processor to perform a method of any of aspects 1 through 15.

Aspect 35: A network entity for wireless communications, comprising one or more memories storing processor-executable code, and one or more processors coupled with the one or more memories and individually or collectively operable to execute the code to cause the network entity to perform a method of any of aspects 16 through 31.

Aspect 36: A network entity for wireless communications, comprising at least one means for performing a method of any of aspects 16 through 31.

Aspect 37: A non-transitory computer-readable medium storing code for wireless communications, the code comprising instructions executable by a processor to perform a method of any of aspects 16 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device for wireless communication, comprising:
   one or more memories storing processor executable code; and
   one or more processors coupled with the one or more memories and individually or collectively operable to execute the code to cause the wireless device to:

transmit a usage cost message indicating a first usage cost associated with a first set of operating parameters supported by the wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and receive an indication for the wireless device to operate according to one of the first set of operating parameters or the second set of operating parameters based at least in part on the first usage cost and the second usage cost.

2. The wireless device of claim 1, wherein the one or more processors are individually or collectively further operable to execute the code to cause the wireless device to:

receive a second indication of a usage cost function associated with calculating usage costs, wherein the first usage cost and the second usage cost are based at least in part on the usage cost function.

3. The wireless device of claim 1, wherein, to transmit the usage cost message, the one or more processors are individually or collectively operable to execute the code to cause the wireless device to:

transmit a second indication of a plurality of codebooks supported by the wireless device, wherein a first codebook of the plurality of codebooks is associated with both the first quantity of receive beams and the first usage cost, wherein a second codebook of the plurality of codebooks is associated with both the second quantity of receive beams and the second usage cost, and wherein the usage cost message comprises the second indication of the plurality of codebooks.

4. The wireless device of claim 1, wherein the one or more processors are individually or collectively further operable to execute the code to cause the wireless device to:

receive a request for the wireless device to provide usage costs associated with each set of operating parameters supported by the wireless device including at least the first set of operating parameters and the second set of operating parameters, wherein transmitting the usage cost message is based at least in part on receiving the request.

5. The wireless device of claim 1, wherein the one or more processors are individually or collectively further operable to execute the code to cause the wireless device to:

receive one or more control signals indicating the first set of operating parameters and the second set of operating parameters, wherein transmitting the usage cost message is based at least in part on receiving the one or more control signals.

6. The wireless device of claim 1, wherein the one or more processors are individually or collectively further operable to execute the code to cause the wireless device to:

transmit a second indication of a usage cost rule associated with communicating using beam sets, wherein the first usage cost and the second usage cost are relative to a third usage cost associated with communicating using a single receive beam based at least in part on the usage cost rule.

7. The wireless device of claim 6, wherein the first quantity of receive beams is associated with a first beam set and the second quantity of receive beams is associated with a second beam set, and wherein the first usage cost and the second usage cost are based at least in part on communicating using the first beam set and the second beam set, respectively.

8. The wireless device of claim 1, wherein the first quantity of receive beams is associated with a first antenna panel at the wireless device and the second quantity of receive beams is associated with a second antenna panel at the wireless device, wherein the first usage cost is based at least in part on communicating using the first antenna panel, and wherein the second usage cost is based at least in part on communicating using the second antenna panel.

9. The wireless device of claim 1, wherein each set of operating parameters comprises a quantity of codebooks, one or more sets of receive beam, one or more processing parameters, an analog to digital converter resolution, a digital power distortion, one or more beamforming parameters, a transmit power, a quantity of repetitions, or any combination thereof.

10. The wireless device of claim 1, wherein each of the first usage cost and the second usage cost comprises a respective indication of a power consumption, a latency, a throughput, a level of interference, or any combination thereof.

11. The wireless device of claim 1, wherein each of the first usage cost and the second usage cost is associated with communicating according to a respective set of operating parameters, maintaining the respective set of operating parameters, training the wireless device according to the respective set of operating parameters, or any combination thereof.

12. The wireless device of claim 1, wherein each of the first usage cost and the second usage cost comprises an absolute value of a respective usage cost or a relative value of the respective usage cost.

13. The wireless device of claim 12, wherein the one or more processors are individually or collectively further operable to execute the code to cause the wireless device to:

receive a second indication of a baseline set of operating parameters, wherein the first usage cost and the second usage cost are relative to a baseline usage cost associated with the baseline set of operating parameters.

14. The wireless device of claim 1, wherein the usage cost message is transmitted semi-statically, semi-persistently, or dynamically.

15. The wireless device of claim 1, wherein the first usage cost and the second usage cost are associated with transmitting one or more signals in accordance with the first set of operating parameters and the second set of operating parameters, respectively, are associated with receiving one or more signals in accordance with the first set of operating parameters and the second set of operating parameters, respectively, or both.

16. A network entity for wireless communication, comprising:

one or more memories storing processor executable code; and one or more processors coupled with the one or more memories and individually or collectively operable to execute the code to cause the network entity to:

receive a usage cost message indicating a first usage cost associated with a first set of operating parameters supported by a wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and transmit an indication for the wireless device to operate according to one of the first set of operating parameters or the second set of operating parameters based at least in part on the first usage cost and the second usage cost.

17. The network entity of claim 16, wherein the one or more processors are individually or collectively further operable to execute the code to cause the network entity to:
transmit a second indication of a usage cost function associated with calculating usage costs, wherein the first usage cost and the second usage cost are based at least in part on the usage cost function.

18. The network entity of claim 16, wherein, to receive the usage cost message, the one or more processors are individually or collectively operable to execute the code to cause the network entity to:
receive a second indication of a plurality of codebooks supported by the wireless device, wherein a first codebook of the plurality of codebooks is associated with both the first quantity of receive beams and the first usage cost, and wherein a second codebook of the plurality of codebooks is associated with both the second quantity of receive beams and the second usage cost, and wherein the usage cost message comprises the second indication of the plurality of codebooks.

19. The network entity of claim 16, wherein the one or more processors are individually or collectively further operable to execute the code to cause the network entity to:
transmit a request for the wireless device to provide usage costs associated with each set of operating parameters supported by the wireless device including at least the first set of operating parameters and the second set of operating parameters, wherein transmitting the usage cost message is based at least in part on receiving the request.

20. The network entity of claim 16, wherein the one or more processors are individually or collectively further operable to execute the code to cause the network entity to:
transmit one or more control signals indicating the first set of operating parameters and the second set of operating parameters, wherein transmitting the usage cost message is based at least in part on receiving the one or more control signals.

21. The network entity of claim 16, wherein the one or more processors are individually or collectively further operable to execute the code to cause the network entity to:
receive a second indication of a usage cost rule associated with communicating using beam sets, wherein the first usage cost and the second usage cost are relative to a third usage cost associated with communicating using a single receive beam based at least in part on the usage cost rule.

22. The network entity of claim 21, wherein the first quantity of receive beams is associated with a first beam set and the second quantity of receive beams is associated with a second beam set, and wherein the first usage cost and the second usage cost are based at least in part on communicating using the first beam set and the second beam set, respectively.

23. The network entity of claim 16, wherein the indication is associated with the wireless device operating according to the first set of operating parameters, and wherein the one or more processors are individually or collectively further operable to execute the code to cause the network entity to:
transmit, to a second wireless device, one or more control signals indicating a third set of operating parameters based at least in part on the first set of operating parameters.

24. The network entity of claim 23, wherein the first set of operating parameters is associated with the network entity communicating with the wireless device via the second wireless device.

25. The network entity of claim 16, wherein the first quantity of receive beams is associated with a first antenna panel at the wireless device and the second quantity of receive beams is associated with a second antenna panel at the wireless device, and wherein the first usage cost and the second usage cost are based at least in part on communicating using the first antenna panel and the second antenna panel, respectively.

26. The network entity of claim 16, wherein each set of operating parameters comprises a quantity of codebooks, one or more sets of receive beam, one or more processing parameters, an analog to digital converter resolution, a digital power distortion, one or more beamforming parameters, a transmit power, a quantity of repetitions, or any combination thereof.

27. The network entity of claim 16, wherein each of the first usage cost and the second usage cost comprises a respective indication of a power consumption, a latency, a throughput, a level of interference, or any combination thereof.

28. The network entity of claim 16, wherein each of the first usage cost and the second usage cost is associated with the wireless device communicating according to a respective set of operating parameters, maintaining the respective set of operating parameters, training the wireless device according to the respective set of operating parameters, or any combination thereof.

29. A method for wireless communications at a wireless device, comprising:
transmitting a usage cost message indicating a first usage cost associated with a first set of operating parameters supported by the wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and
receiving an indication for the wireless device to operate according to one of the first set of operating parameters or the second set of operating parameters based at least in part on the first usage cost and the second usage cost.

30. A method for wireless communications at a network entity, comprising:
receiving a usage cost message indicating a first usage cost associated with a first set of operating parameters supported by a wireless device and indicating a second usage cost associated with a second set of operating parameters supported by the wireless device, the second set of operating parameters different from the first set of operating parameters, wherein the first set of operating parameters comprises a first quantity of receive beams of the wireless device for operating according to the first set of operating parameters, and wherein the second set of operating parameters comprises a second quantity of receive beams of the wireless device for operating according to the second set of operating parameters; and transmitting an indication for the wireless device to operate according to one of the first set of operating parameters or the second set of operating parameters based at least in part on the first usage cost and the second usage cost.

\* \* \* \* \*